US012668038B2

(12) United States Patent
Sekar et al.

(10) Patent No.: US 12,668,038 B2
(45) Date of Patent: Jun. 30, 2026

(54) SPHERE-BASED STRUCTURAL CORE LAYER AND METHOD FOR USE IN AIRCRAFT

(71) Applicant: The Boeing Company, Arlington, VA (US)

(72) Inventors: Vinodh Kumar Sekar, Hosur (IN); Priyadarsh Sudarsanan Jamini, Thiruvananthapuram (IN); Ram Ji Omar, Banda (IN); Rajalakshmi Ramalingam, Chennai (IN); James John, Bangalore (IN)

(73) Assignee: THE BOEING COMPANY, Arlington, VA (US)

( * ) Notice: Subject to any disclaimer, the term of this patent is extended or adjusted under 35 U.S.C. 154(b) by 17 days.

(21) Appl. No.: 18/618,105

(22) Filed: Mar. 27, 2024

(65) Prior Publication Data

US 2025/0303666 A1      Oct. 2, 2025

(51) Int. Cl.
| | |
|---|---|
| *B32B 3/20* | (2006.01) |
| *B32B 5/18* | (2006.01) |
| *B32B 7/12* | (2006.01) |
| *B33Y 80/00* | (2015.01) |
| *B64C 1/00* | (2006.01) |

(52) U.S. Cl.
CPC .................. *B32B 3/20* (2013.01); *B32B 5/18* (2013.01); *B32B 7/12* (2013.01); *B32B*

*2605/18* (2013.01); *B33Y 80/00* (2014.12); *B64C 2001/0072* (2013.01)

(58) Field of Classification Search
CPC ....................................................... B32B 3/20
See application file for complete search history.

(56) References Cited

U.S. PATENT DOCUMENTS

| | | | | |
|---|---|---|---|---|
| 4,861,649 | A * | 8/1989 | Browne .................... | B32B 5/24 |
| | | | | 428/313.5 |
| 2011/0281114 | A1* | 11/2011 | Butler ....................... | B32B 7/12 |
| | | | | 156/182 |
| 2016/0167763 | A1* | 6/2016 | Brakes ...................... | B64C 3/20 |
| | | | | 156/60 |

* cited by examiner

*Primary Examiner* — Humera N. Sheikh
*Assistant Examiner* — Julia L Rummel
(74) *Attorney, Agent, or Firm* — COATS & BENNETT, PLLC

(57) ABSTRACT

Present aspects are directed to a panel assembly comprising a reinforcing core that can be incorporated into a structural panel assembly, with the panel assembly comprising a reinforcing core having a plurality of substantially identically-dimensioned hollow spheres positioned within a foam material, with the reinforcing core configured to further comprise an adhesive layer interposed between a side of the reinforcing core and a facesheet that can be a composite material facesheet.

20 Claims, 17 Drawing Sheets

16a

16

100

102 — INCORPORATE PLURALITY OF HOLLOW SPHERES
INTO FIRST FOAM SEGMENT

104 — APPLY SECOND FOAM SEGMENT TO
PLURALITY OF HOLLOW SPHERES

106 — APPLY FIRST ADHESIVE LAYER TO
REINFORCING CORE FIRST SIDE

108 — APPLY SECOND ADHESIVE LAYER TO
REINFORCING CORE SECOND SIDE

110 — FORM REINFORCING CORE ASSEMBLY

112 — CO-CURE TWO OR MORE OF
REINFORCING CORE ASSEMBLY

302 — PROVIDE REINFORCING CORE

304 — APPLY FIRST ADHESIVE LAYER
TO REINFORCING CORE FIRST SIDE

306 — APPLY SECOND ADHESIVE LAYER
TO REINFORCING CORE SECOND SIDE

308 — ADHERE FIRST FACESHEET TO
FIRST ADHESIVE LAYER

310 — ADHERE SECOND FACESHEET
TO SECOND ADHESIVE LAYER

300

502 — REMOVE SECTION OF PANEL ASSEMBLY

504 — REPLACE SECTION OF PANEL ASSEMBLY WITH REPLACEMENT PANEL ASSEMBLY PLUG

500

SPHERE-BASED STRUCTURAL CORE LAYER AND METHOD FOR USE IN AIRCRAFT

TECHNOLOGICAL FIELD

The present disclosure relates, generally, to the field of structural core layers and structural core materials. More specifically, the present disclosure relates to the field of structural reinforcing materials configured for use in a structural component as a structural core layer.

BACKGROUND

Composite materials that can be used as structural materials typically feature a series of layers combined into a finished composite material structural component that can be installed into a larger structure. The separate layers incorporated into a composite material can provide a fabricated composite material structural component with various material attributes that can include an increased strength-to-weight ratio as compared to a unitary structural material. That is, lighter weight composite materials can be combined as layers to yield a finished structural material that is as robust as a single component denser material, and that can possess a lower overall weight as compared to a structural material comprising a single, denser material having a higher structural component weight.

Honeycomb sandwich panels typically incorporate an internal honeycomb layer into a layered composite material structure having facesheets on both sides of the honeycomb layer, with the honeycomb layer included to form a more robust composite material structural component. Honeycomb sandwich panels can present challenges when a structural component comprises a complex shape that can include irregular geometry. In addition, honeycomb sandwich panels can be labor intensive to fabricate, can sustain deformation during handling, can sustain deformation in transit prior to incorporation into a composite material structural component, and can present labor-intensive challenges when rework of a structural component comprising a honeycomb sandwich panel is conducted.

Unless explicitly identified as such, no statement herein is admitted as prior art merely by its inclusion in the Technological Field and/or Background section.

SUMMARY

Present aspects are directed to a high performance, lightweight panel assembly and reinforcing core assembly for such panels that can be further incorporated into structural components, including aircraft and aircraft cabin components. Present aspects are directed to a panel assembly comprising a reinforcing core that can be incorporated into a structural panel assembly, with the panel assembly comprising a reinforcing core having a plurality of substantially identically-dimensioned hollow spheres positioned within a foam material, with the reinforcing core configured to further comprise an adhesive layer interposed between a side of the reinforcing core and a facesheet that can be a composite material facesheet.

A present aspect is directed to a panel assembly including a first facesheet including a first facesheet first side (referred to equivalently herein as a first facesheet "outer surface") and a first facesheet second side (referred to equivalently herein as a first facesheet "inner surface"), and with the first facesheet including at least one of a metal material and a composite material. The panel assembly further includes a second facesheet including a second factsheet first side (referred to equivalently herein as a second facesheet outer surface) and a second facesheet second surface (referred to equivalently herein as a second facesheet "inner surface"), with the second facesheet including at least one of a metal material and a composite material. The panel assembly further includes a reinforcing core including a reinforcing core first side and a reinforcing core second side, with reinforcing core interposed between the first facesheet inner surface and the second facesheet inner surface. The reinforcing core further includes, a plurality of hollow spheres positioned immediately adjacent to one another, with the plurality of hollow spheres including a hollow sphere outer surface, and with the hollow spheres further including a hollow sphere outer diameter (D1), and a hollow sphere inner diameter (D2), and a hollow sphere wall, with the hollow sphere wall having a hollow sphere wall thickness. The reinforcing core further includes at least one foam material layer segment that can be a two-part foam material layer, with the plurality of hollow spheres positioned within the at least one foam material layer segment, with the at least one foam material layer segment in combination with the plurality of hollow spheres configured to form the reinforcing core. The panel assembly further includes a first adhesive layer positioned between the reinforcing core first side and the first facesheet inner surface, and a second adhesive layer positioned between the reinforcing core second side and the second facesheet inner surface.

In another aspect, the at least one foam material layer segment comprises a foam material layer first segment and a foam material layer second segment.

In another present aspect, the plurality of hollow spheres have substantially equivalent hollow sphere outer diameters D1, with the plurality of hollow spheres further including substantially equivalent hollow sphere outer diameters D2 to form hollow sphere walls having a substantially equivalent hollow sphere wall thicknesses among the plurality of hollow spheres.

In another present aspect, the hollow sphere wall thicknesses can be tailored to form a varied wall thickness within a single hollow sphere.

In another present aspect, the wall thicknesses among adjacently positioned and/or remotely positioned hollow spheres can be tailored to form varied wall thicknesses between adjacently positioned and/or remotely positioned hollow spheres.

In another present aspect, the at least one foam material layer segment is a two-part foam material layer.

In another present aspect, the plurality of hollow spheres are positioned at a selected uniform distance from one another.

In another present aspect, the plurality of hollow spheres are interconnected to one another, with the plurality of hollow spheres comprising interconnects.

In another present aspect, a plurality of interconnected hollow spheres are additively manufactured.

In a further present aspect, the plurality of hollow spheres each comprise a hollow sphere wall, with the hollow sphere wall comprising a hollow sphere wall average thickness (T1) ranging from about 0.8 μm to about 1.2 μm.

In another present aspect, the first adhesive layer is a first adhesive single film layer, and wherein the second adhesive film layer is a second adhesive single film layer.

In another present aspect, the first facesheet and the second facesheet both comprise a composite material.

In another aspect, the first facesheet and the second facesheet can each comprise the same composite material.

In a further aspect, the first facesheet and the second facesheet can each comprise a different composite material.

In another present aspect, the composite material includes an epoxy resin-containing material.

In another present aspect, the first and second facesheets comprise at least one epoxy resin-containing material prepreg.

In another present aspect, the first and second facesheets comprise an epoxy resin-containing material prepreg stack.

Another present aspect is directed to an object comprising the presently disclosed panel assembly.

Another present aspect is directed to a vehicle comprising the presently disclosed panel assembly.

Another present aspect is directed to an aircraft component assembly comprising the presently disclosed panel assembly.

A further present aspect is directed to an aircraft comprising the presently disclosed panel assembly.

Another present aspect is directed to a reinforcing core for a panel assembly, with the reinforcing core including a reinforcing core first side and a reinforcing core second side, and a plurality of hollow spheres positioned immediately adjacent to one another, with the plurality of hollow spheres including a hollow sphere outer surface. The plurality of hollow spheres further include a hollow sphere outer diameter (D1), a hollow sphere inner diameter (D2), and a hollow sphere wall having a hollow sphere wall thickness. The reinforcing core further includes at least one foam material layer segment, with the plurality of hollow spheres positioned within the at least one foam material layer segment, and with the at least one foam material layer segment in combination with the plurality of hollow spheres configured to form the reinforcing core.

In another present aspect, the reinforcing core further includes a first adhesive layer on the reinforcing core first side, and a second adhesive layer on the reinforcing core second side, with the reinforcing core in combination with the first and second adhesive layers configured to form a reinforcing core assembly.

In another present aspect, the plurality of hollow spheres are interconnected hollow spheres.

In a further present aspect, the plurality of interconnected hollow spheres are additively manufactured.

In another present aspect, the reinforcing core is configured to attenuate sound to a selected degree.

In a further present aspect, one or more of the plurality of hollow spheres include at least one through-opening through a hollow sphere wall average thickness (T1), with the hollow sphere wall average thickness (T1) ranging from about 0.8 μm to about 1.2 μm.

In another present aspect, the plurality of hollow spheres is co-curable at a selected co-curing temperature with at least one of the first adhesive layer and the second adhesive layer.

In another present aspect, the first adhesive layer is co-curable with the second adhesive layer at a selected co-curing temperature.

In another present aspect, at least two of the first adhesive layer, the second adhesive layer and the plurality of hollow spheres are co-curable at a selected co-curing temperature.

In another present aspect, the co-curing temperature is a temperature ranging from about 248° F. to about 350° F.

In another present aspect, the co-curing temperature is a temperature ranging from about 65° F. to about 80° F.

Another present aspect is directed to a composite material assembly stack comprising the presently disclosed reinforcing core.

Another present aspect is directed to a vehicle comprising the presently disclosed reinforcing core.

Another present aspect is directed to an aircraft component assembly comprising the presently disclosed reinforcing core.

Another present aspect is directed to an aircraft comprising the presently disclosed reinforcing core.

Another present aspect is directed to a method for making a reinforcing core assembly, with the method including incorporating a plurality of hollow spheres into a first foam material layer segment. The method further includes applying a second foam material layer segment to the plurality of hollow spheres to form a reinforcing core, with reinforcing core comprising a reinforcing core first side and a reinforcing core second side, applying a first adhesive layer to the reinforcing core first side, applying a second adhesive layer to the reinforcing core second side, and forming the reinforcing core assembly, with reinforcing core assembly comprising the first adhesive layer, the second adhesive layer, and the reinforcing core.

In another aspect, the method further includes co-curing two or more of the first adhesive layer, the second adhesive layer, and the plurality of the interconnected hollow spheres at a selected co-curing temperature.

In another present aspect, the method further includes additively manufacturing the plurality of interconnected hollow spheres.

Another present aspect is directed to a method for making a panel assembly, with the method including providing a reinforcing core, with the reinforcing core including a reinforcing core first side, a reinforcing core second side, and a plurality of hollow spheres positioned immediately adjacent to one another, said plurality of hollow spheres comprising a hollow sphere outer surface, with the plurality of hollow spheres further comprising a hollow sphere outer diameter (D1), and with the plurality of hollow spheres further comprising a hollow sphere inner diameter (D2), a hollow sphere wall, with the hollow sphere wall having a hollow sphere wall thickness. The reinforcing core further includes a foam material layer that can comprise at least one foam material layer segment, with the plurality of hollow spheres positioned within the foam material layer, and with the foam material layer in combination with the plurality of hollow spheres configured to form the reinforcing core. The method further includes applying a first adhesive layer to the reinforcing core first side, applying a second adhesive layer to the reinforcing core second side, adhering a first facesheet to the first adhesive layer and adhering a second facesheet to the second adhesive layer to form the panel assembly.

In another present aspect, the foam material layer is a two-part foam material layer.

In another present aspect, the method further includes co-curing two or more of the first adhesive layer, the second adhesive layer, and the plurality of the interconnected hollow spheres, the first facesheet, and the second facesheet at a selected co-curing temperature.

In another present aspect, at least one of the first face sheet and the second facesheet comprises a composite material.

In another present aspect, at least one of the first facesheet and the second facesheet comprises an epoxy-resin containing composite material.

In a further present aspect, at least one of the first facesheet and the second facesheet comprises more than one an epoxy-resin containing composite material prepreg.

Another present aspect is directed to a method for reworking a panel assembly, with the method including removing a selected section of the panel assembly, with the selected section of the panel assembly comprising a selected panel assembly dimension, and replacing, in situ, the selected section of the panel assembly with a replacement panel assembly plug, with the replacement panel assembly plug comprising a replacement panel assembly plug dimension. The replacement panel assembly plug panel further includes a reinforcing core, with the reinforcing core including at least one foam material layer segment, and with the reinforcing core further including a plurality of hollow spheres, and wherein the replacement panel assembly plug dimension is substantially equivalent to the selected panel assembly dimension.

Another present aspect is directed to a panel assembly reworked according to the presently disclosed method for reworking a panel assembly.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
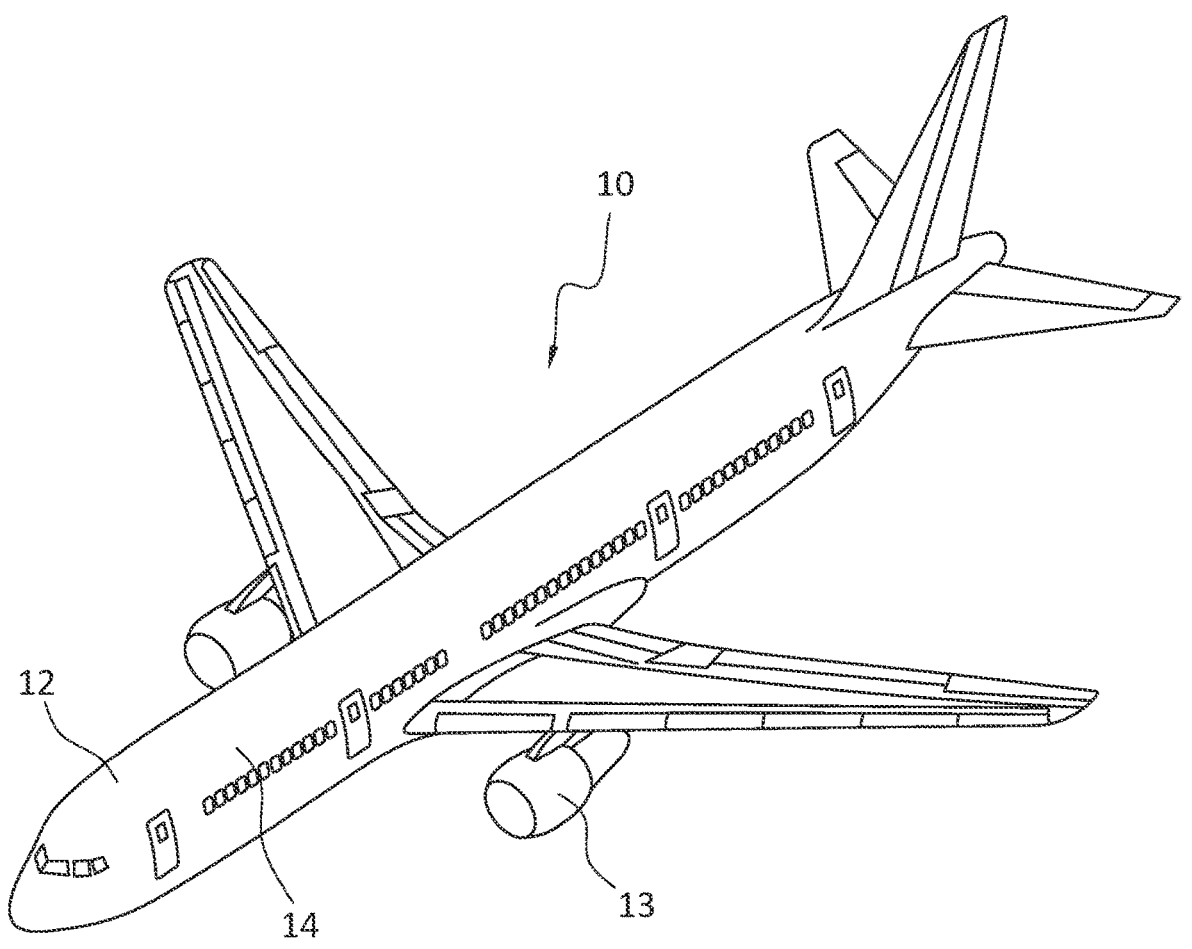
Figure 2:
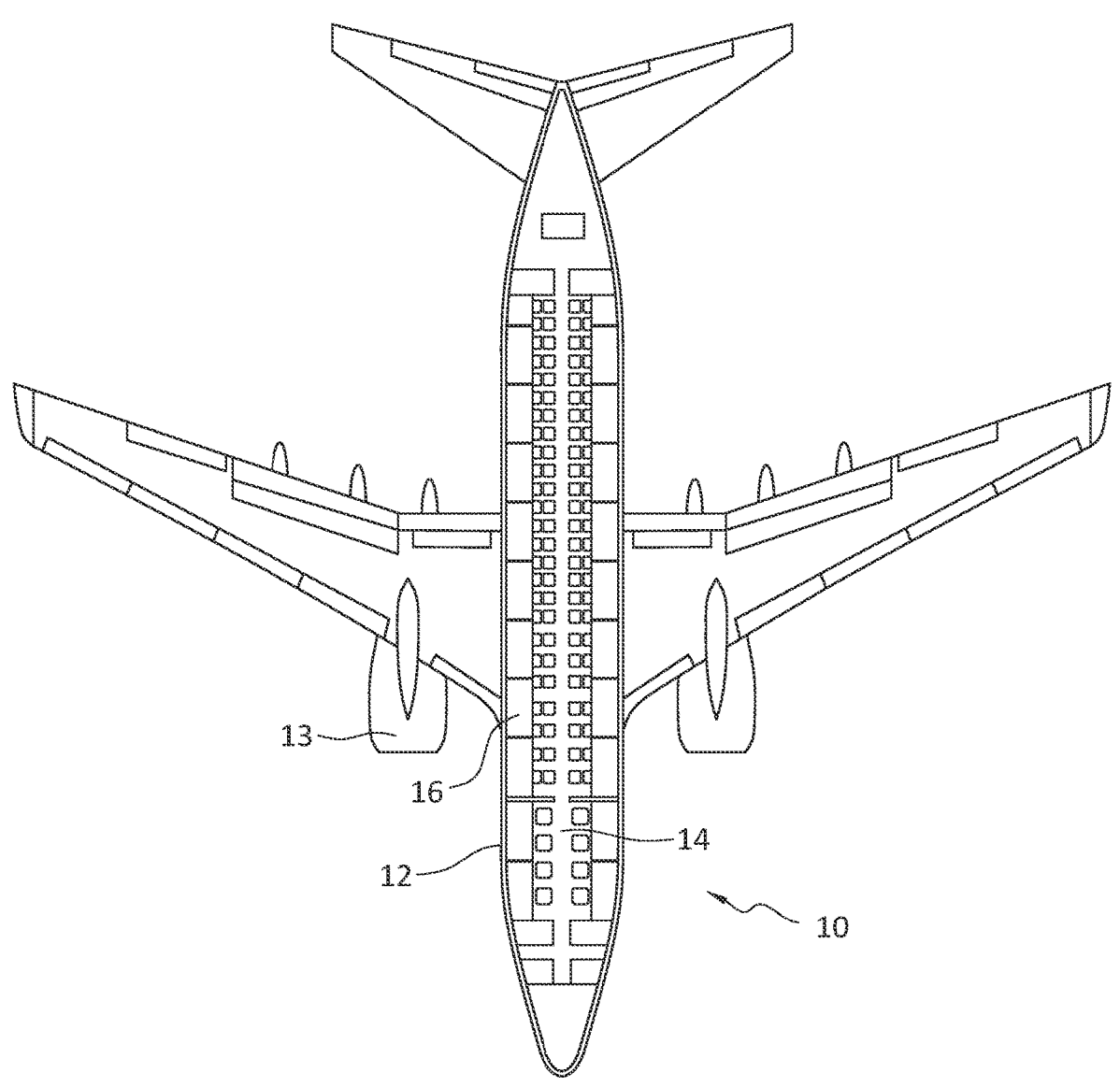
Figure 3:
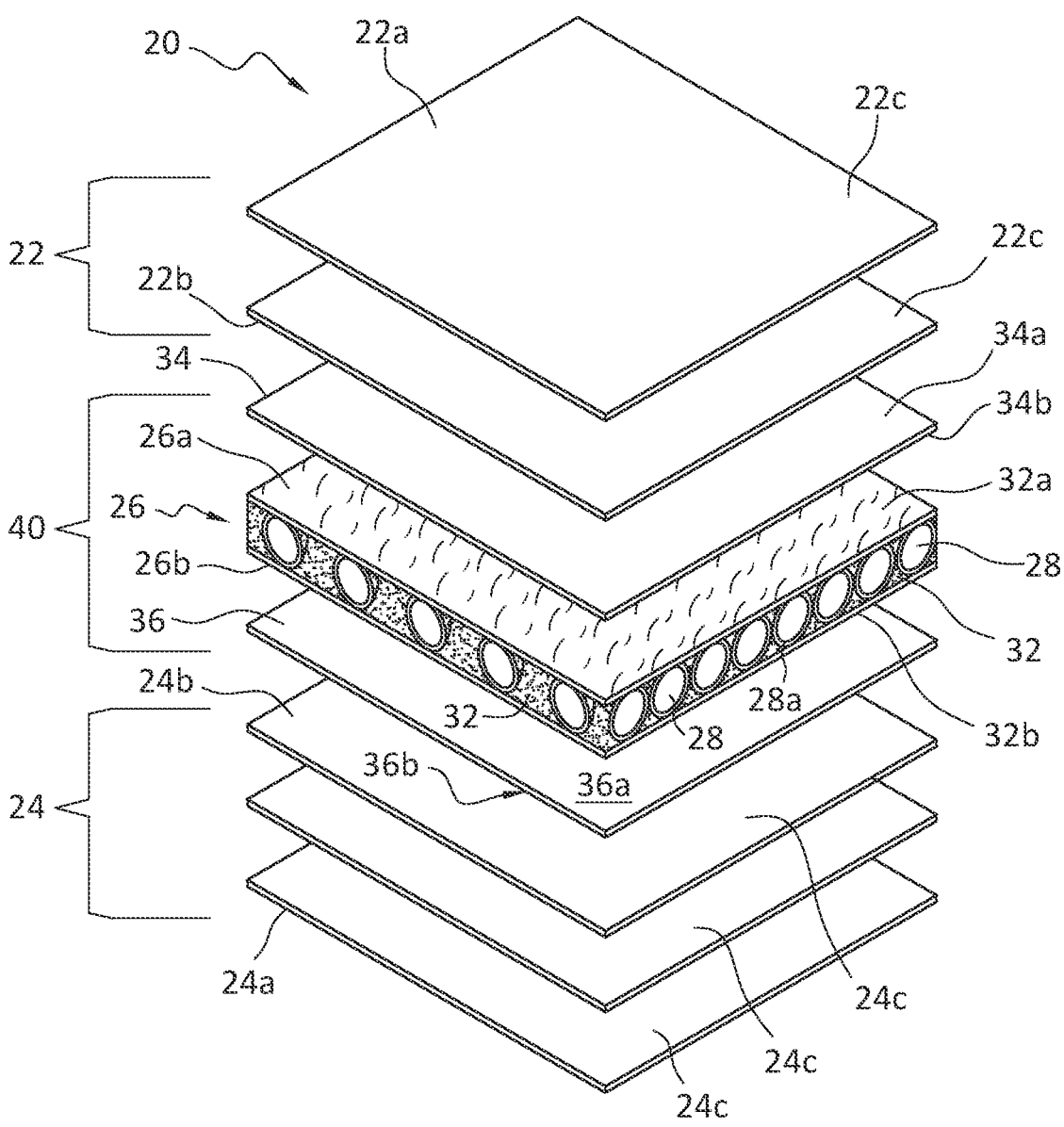
Figures 4, 5:
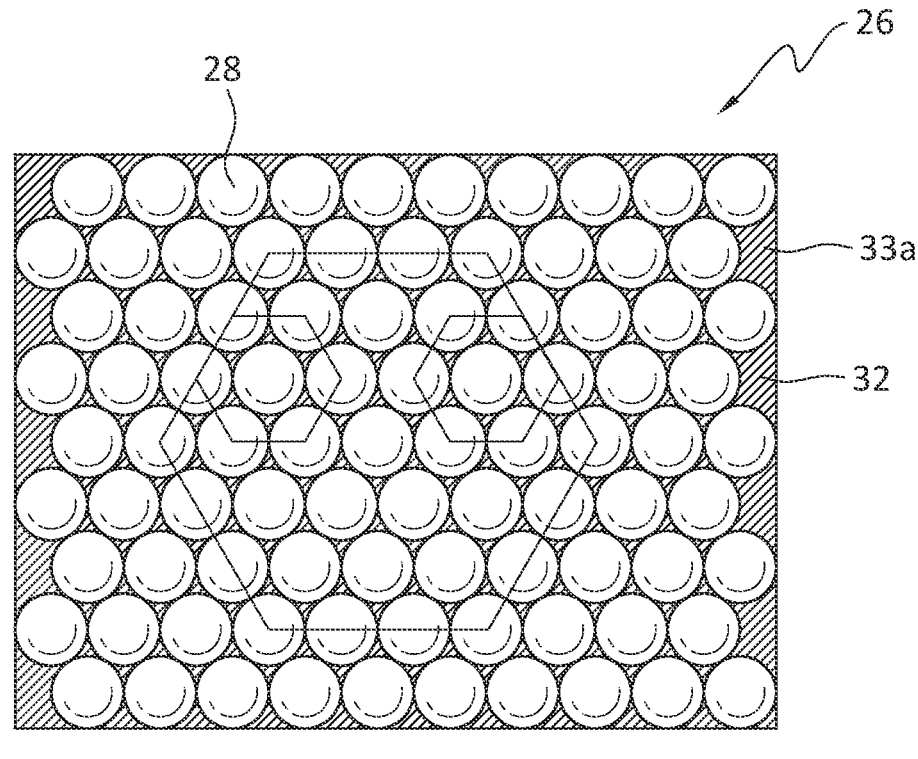
Figure 6:
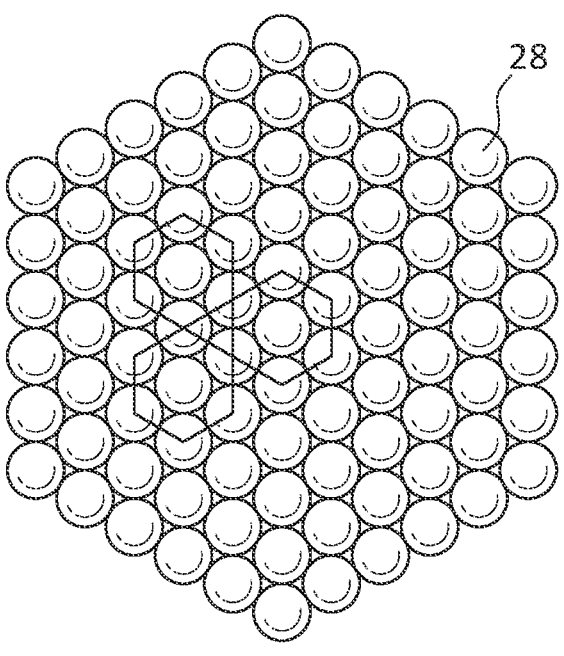
Figure 7:
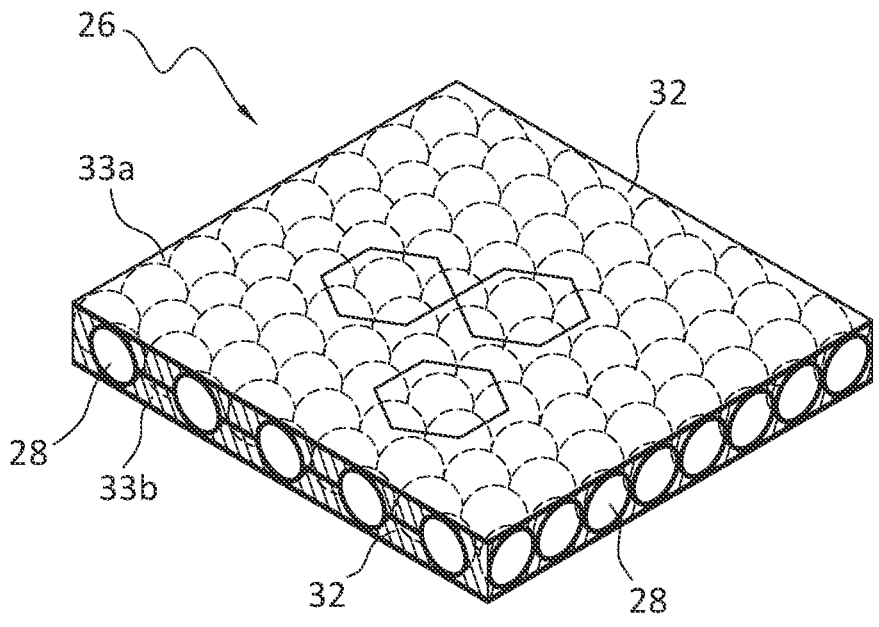
Figures 8, 9, 10:
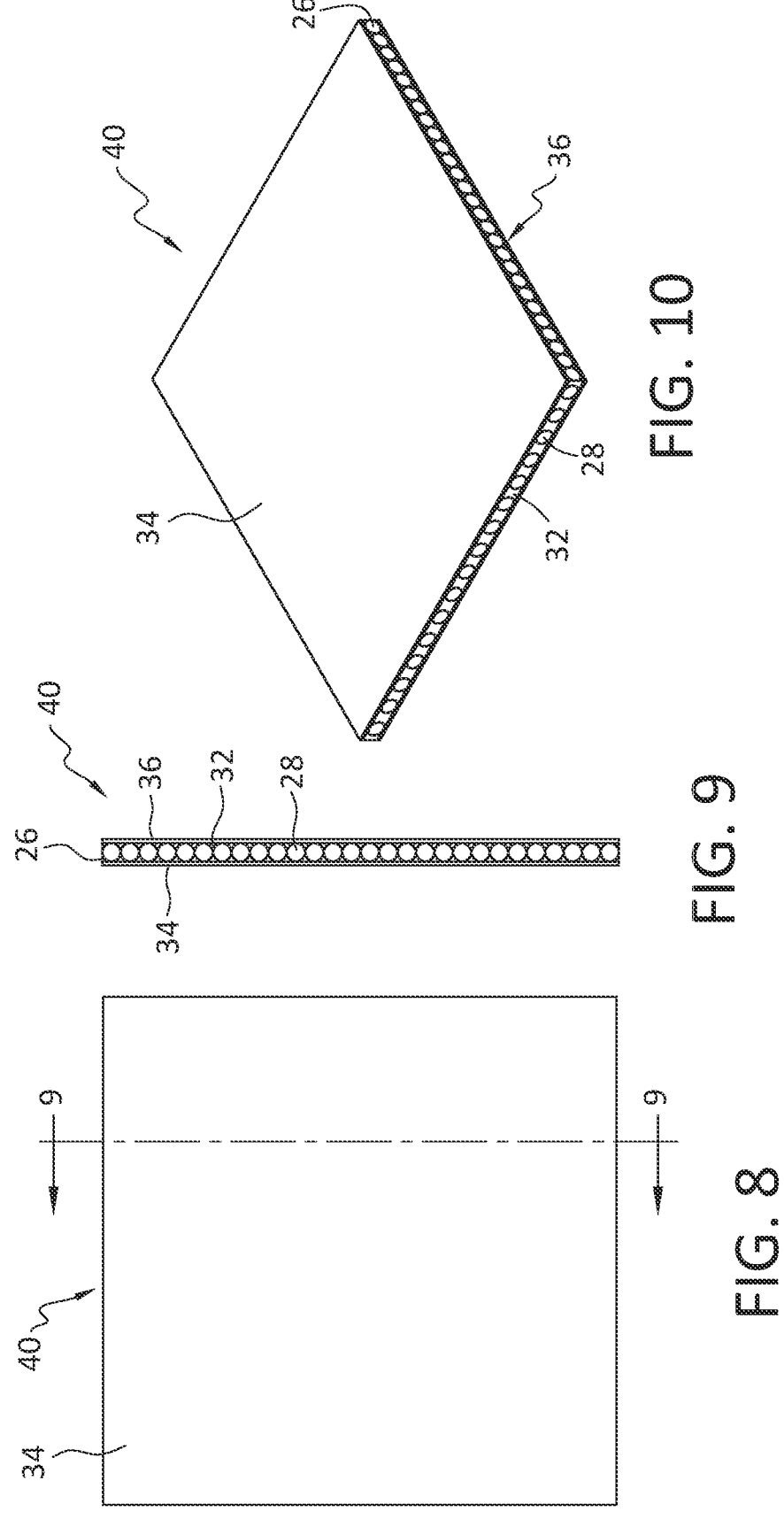
Figures 11, 12A, 12B:
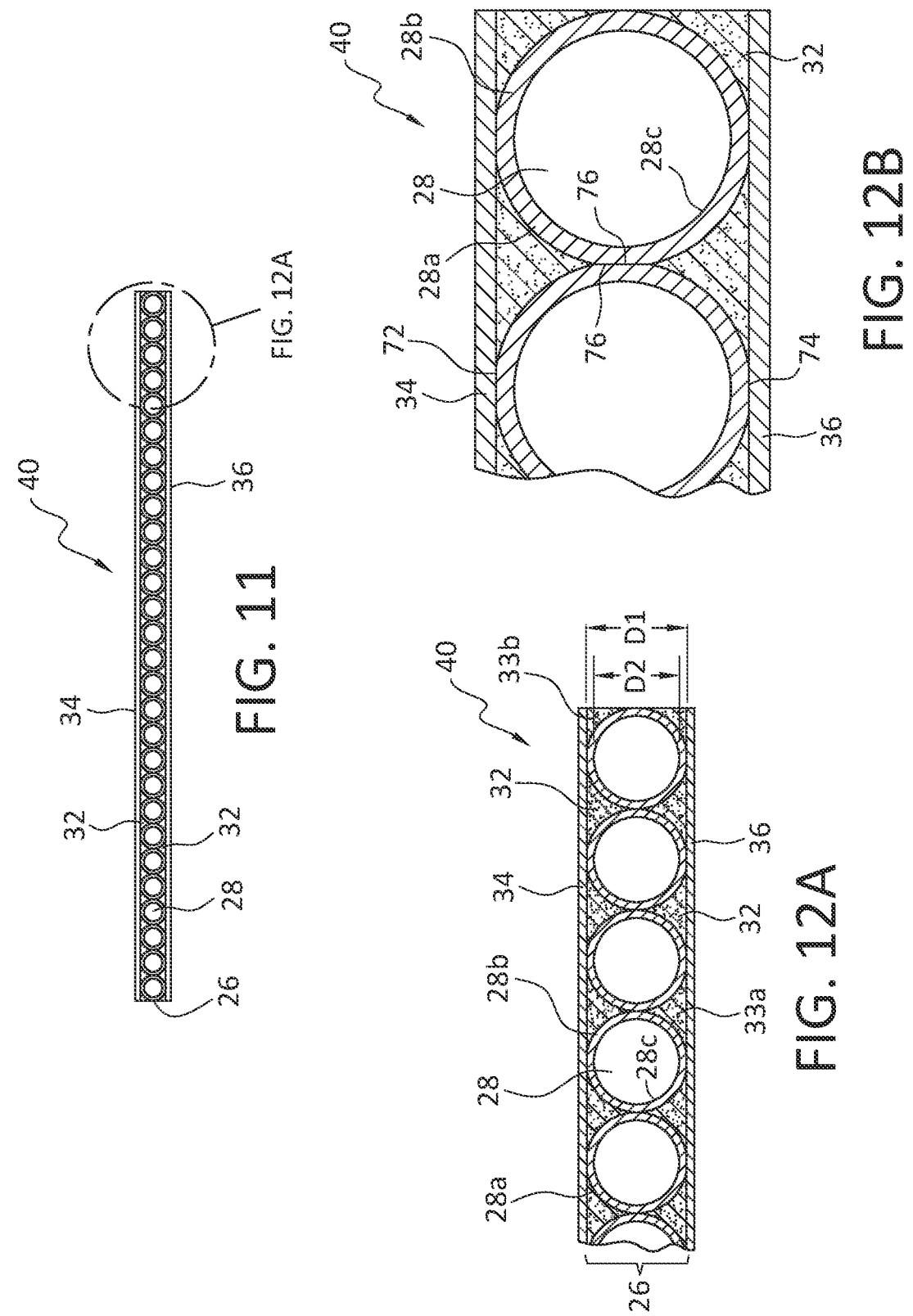
Figures 13A, 13B:
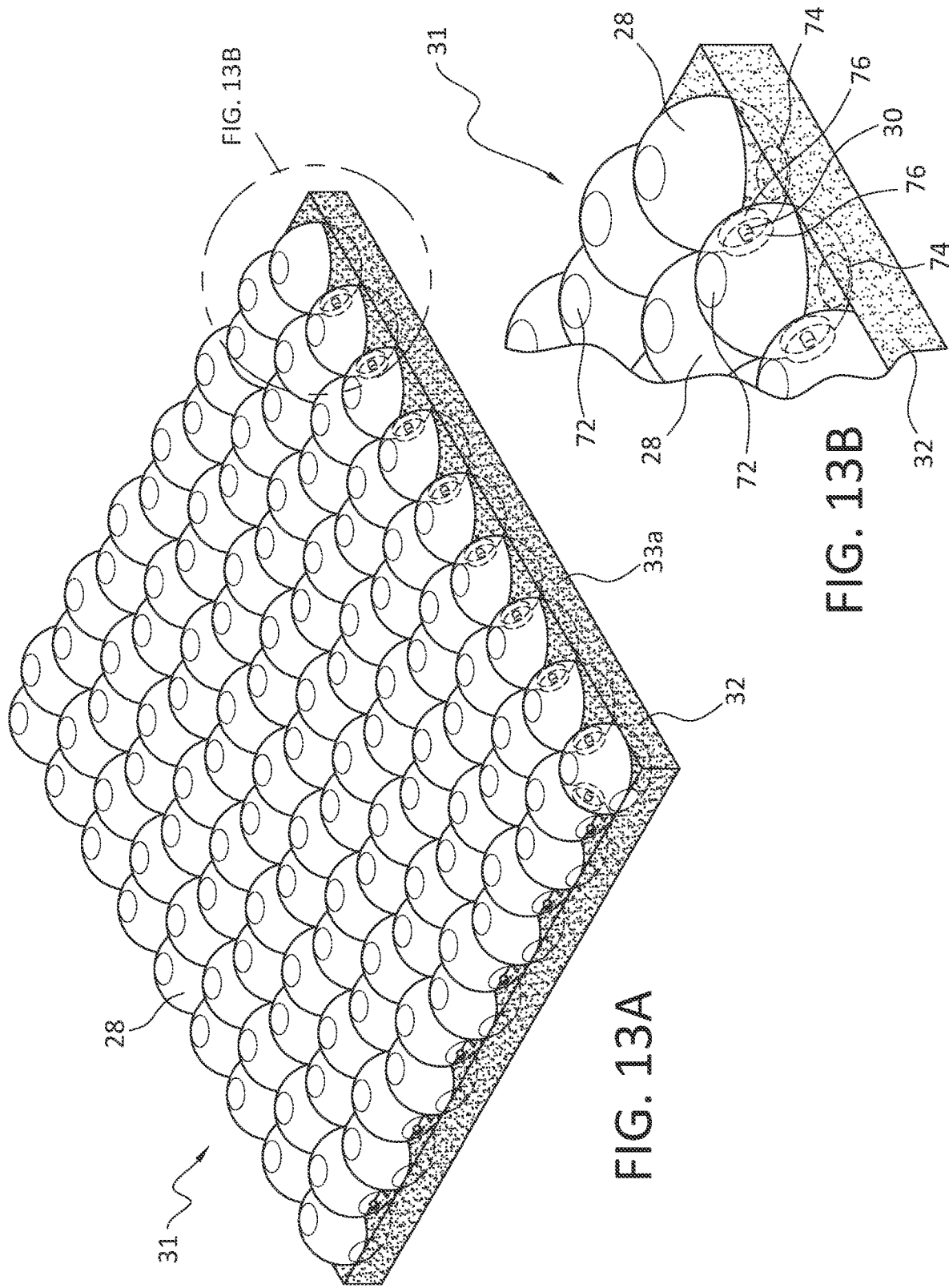
Figures 14, 15:
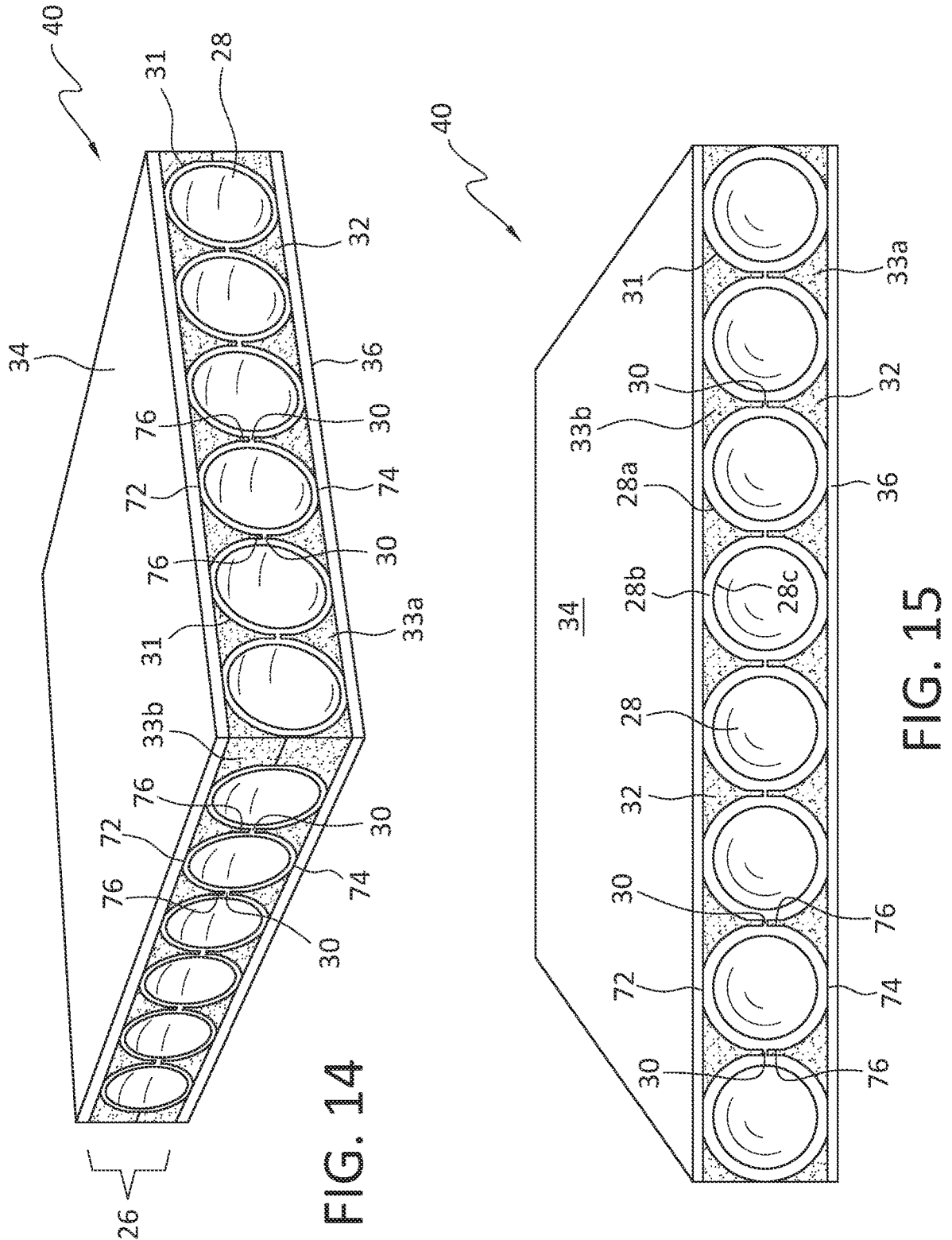
Figures 16, 17A, 17B, 18:
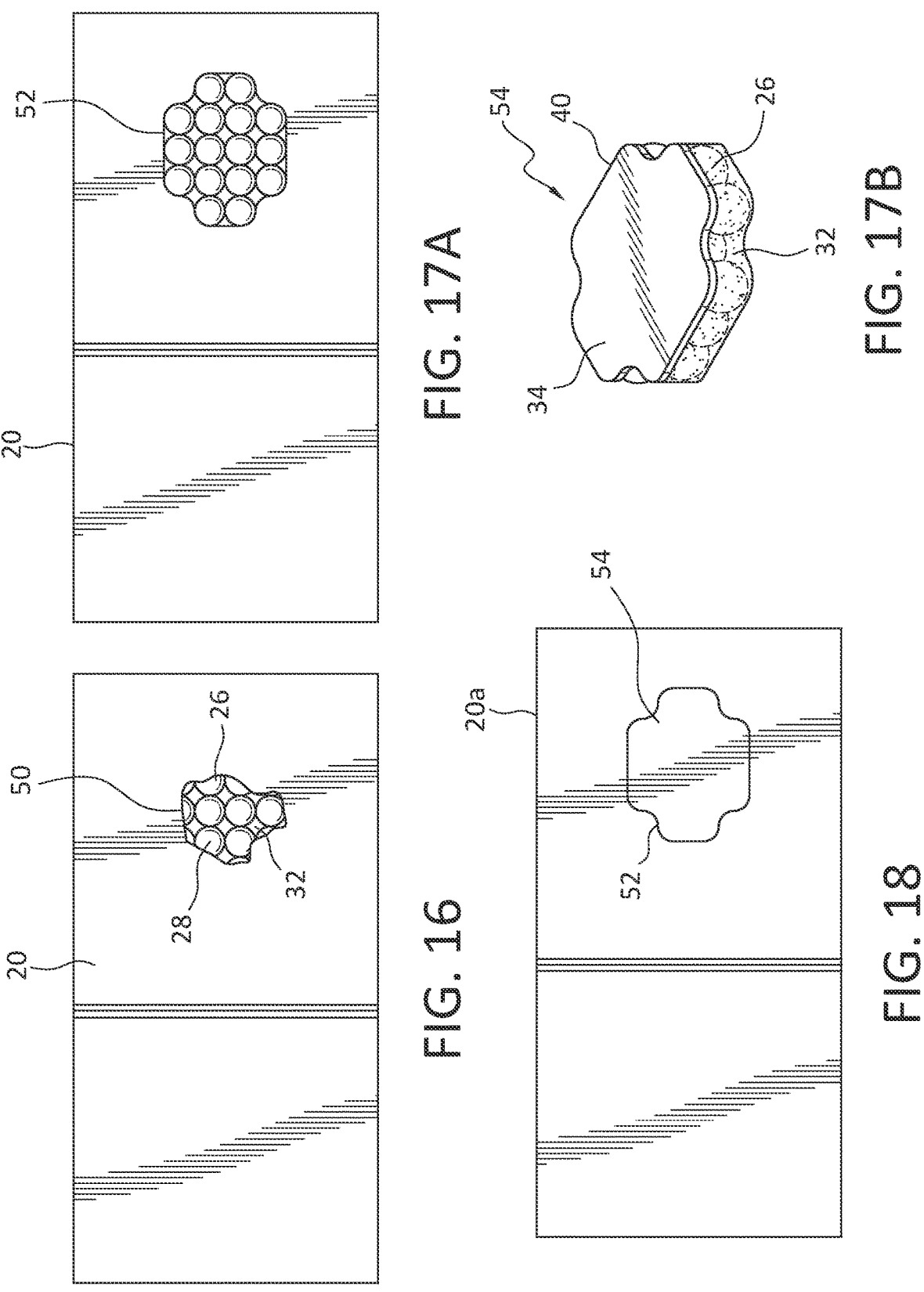
Figures 19, 20, 21:
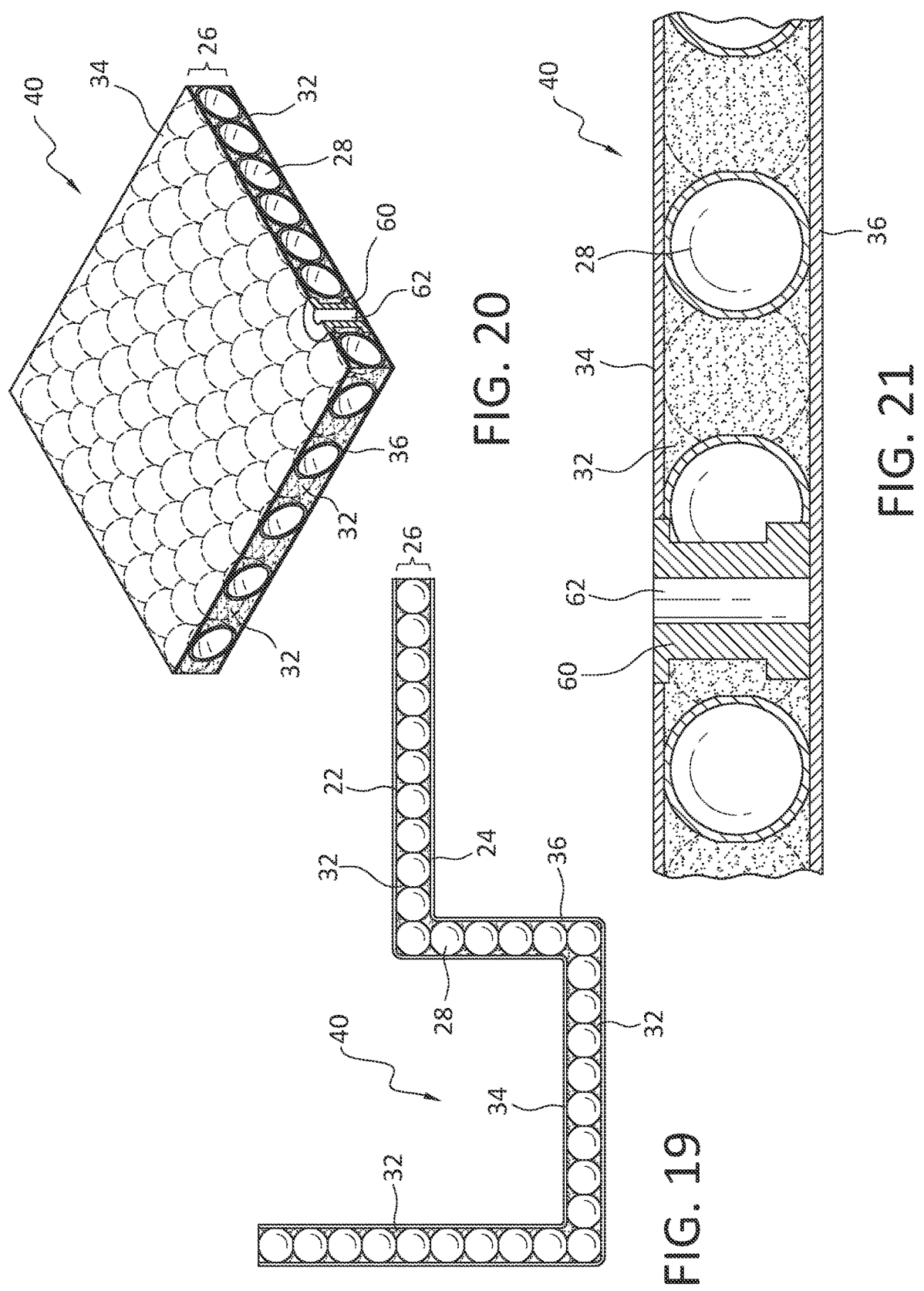
Figures 22, 23:
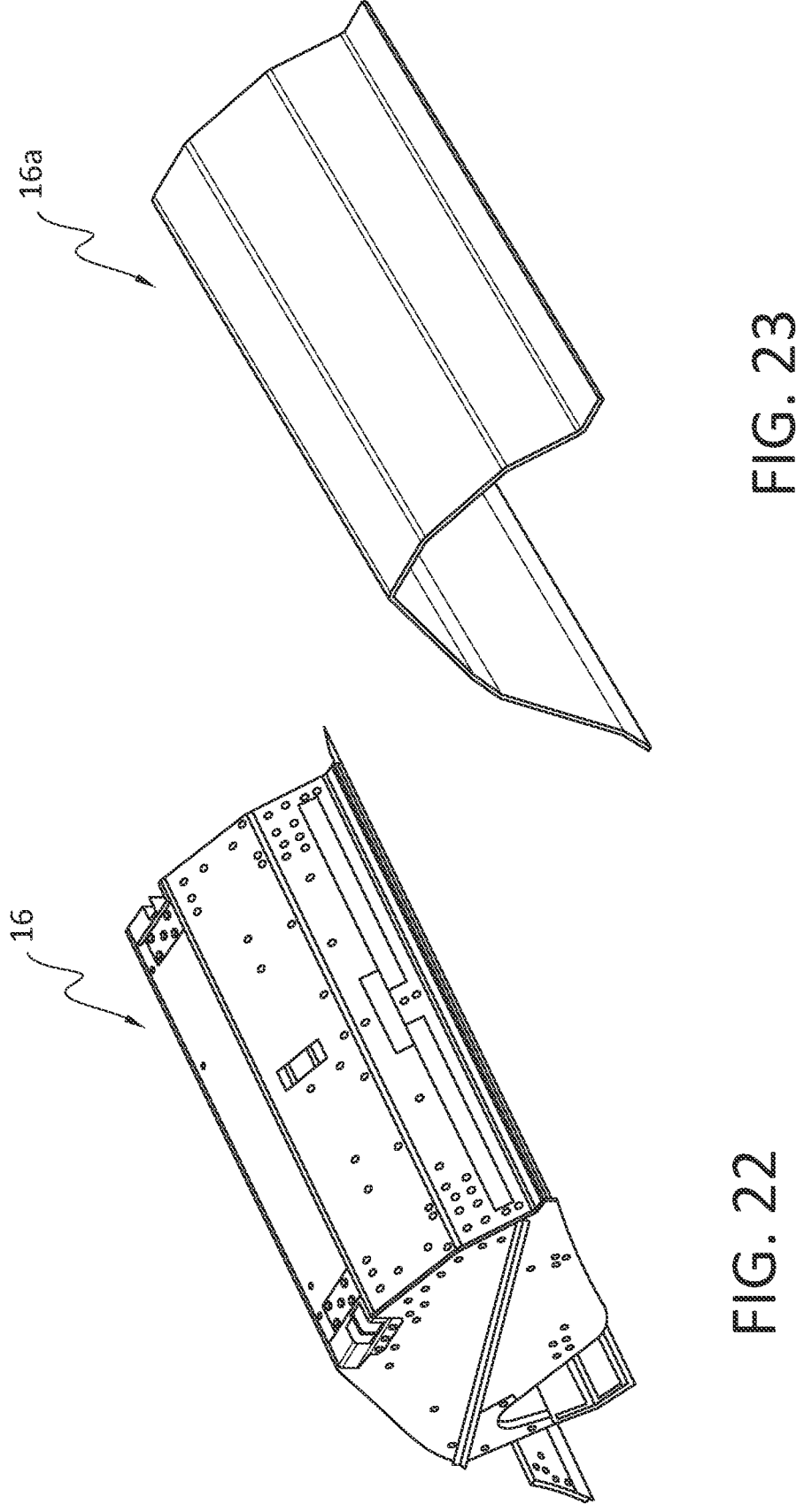
Figure 24:
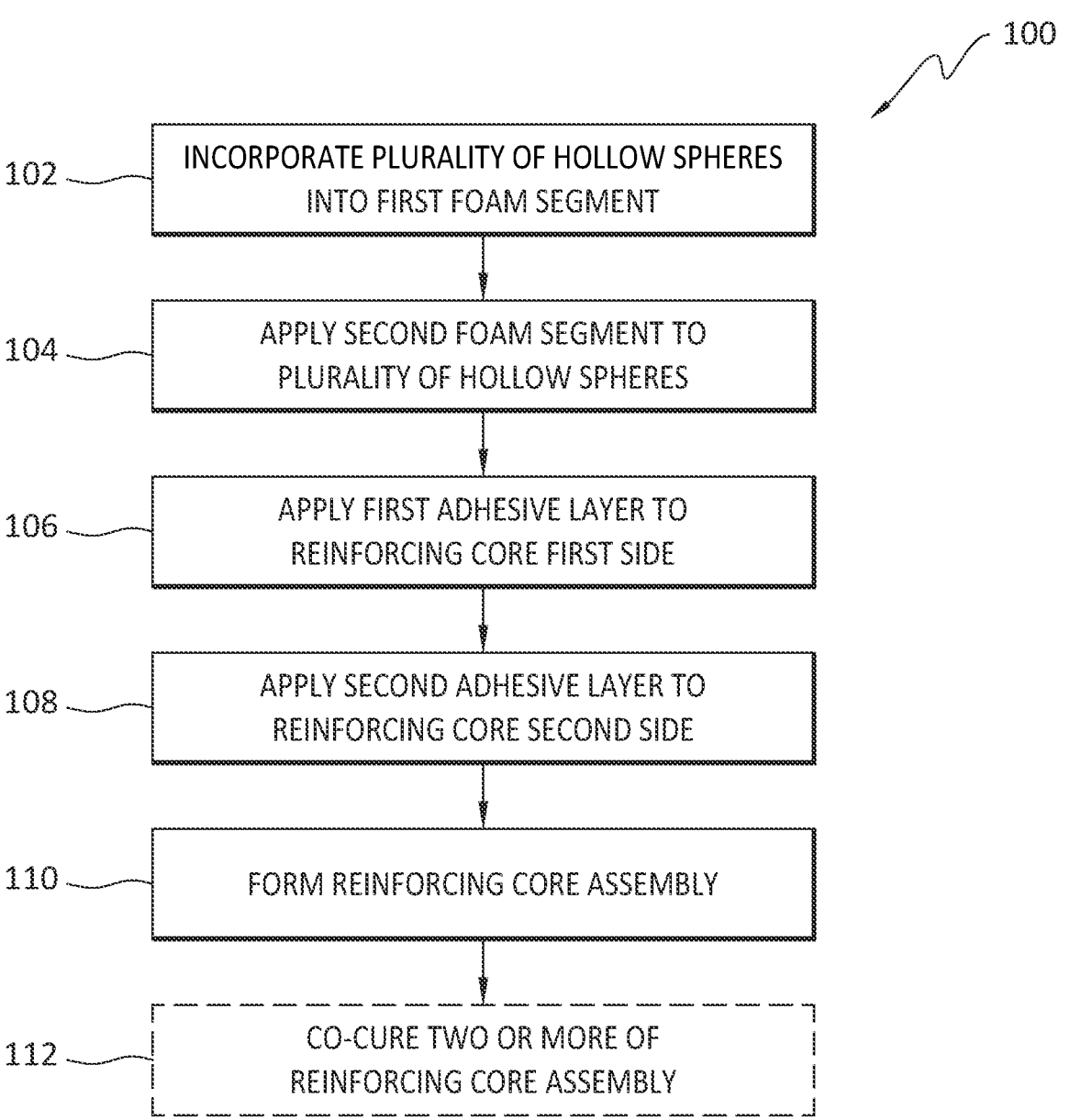
Figure 25:
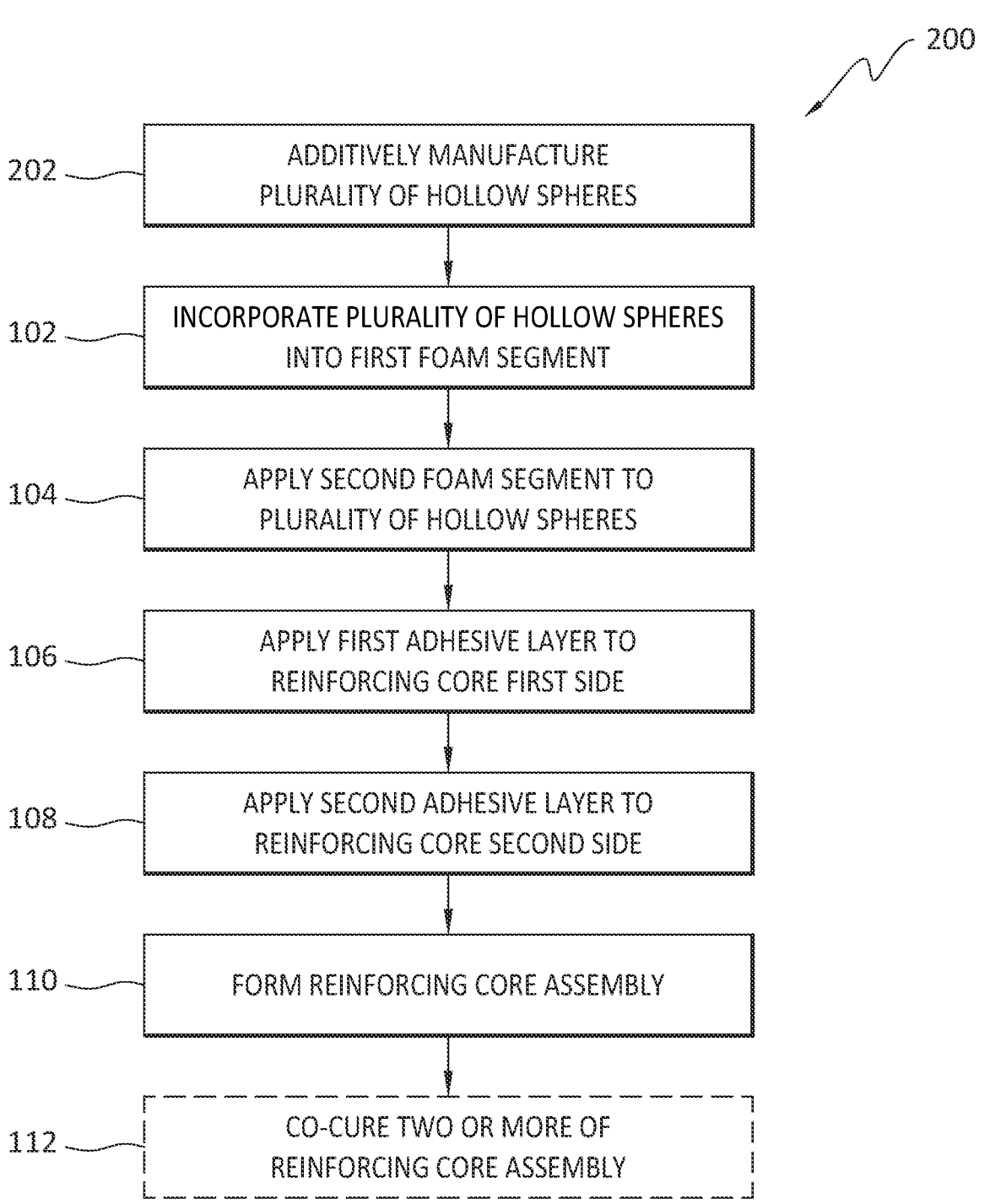
Figure 26:
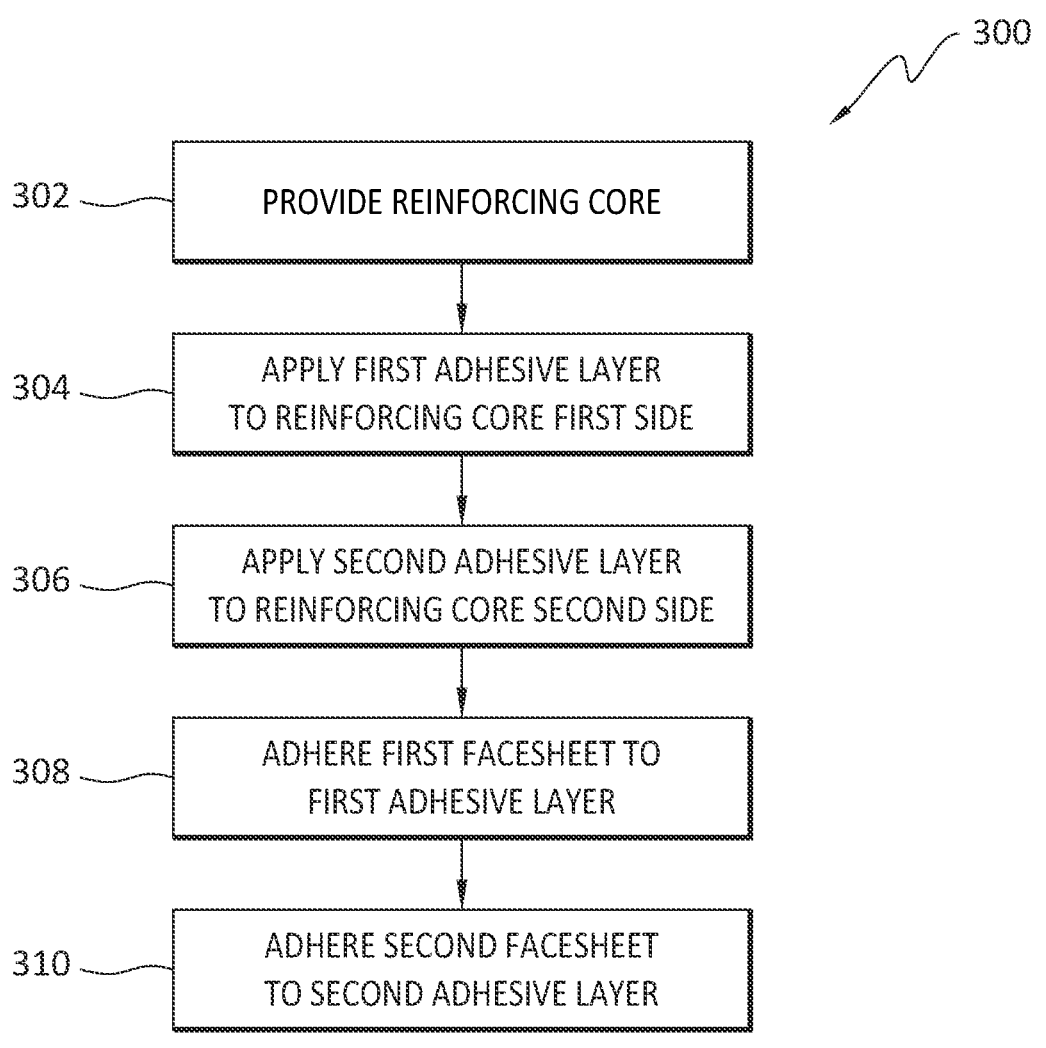
Figure 27:
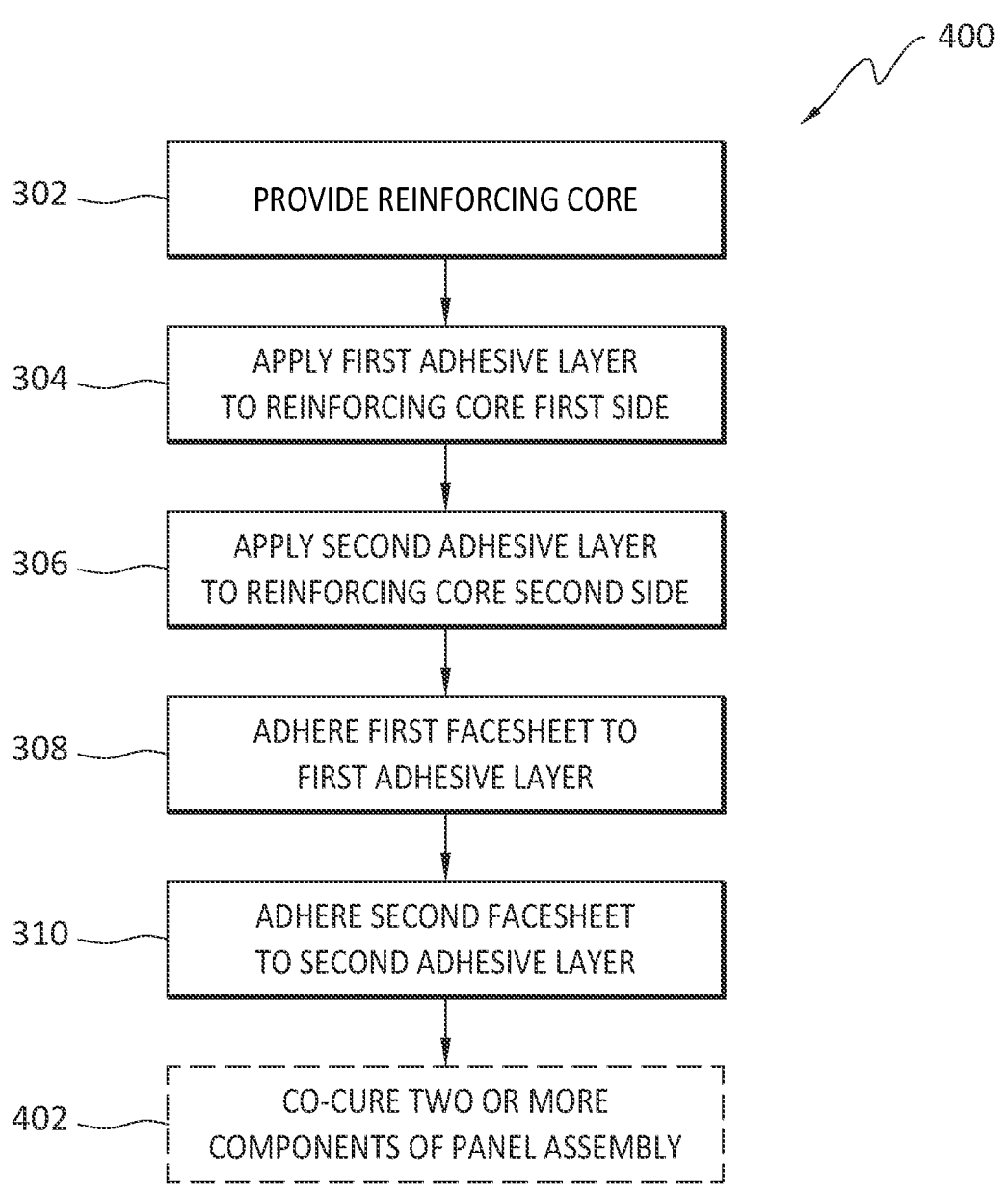
Figure 28:
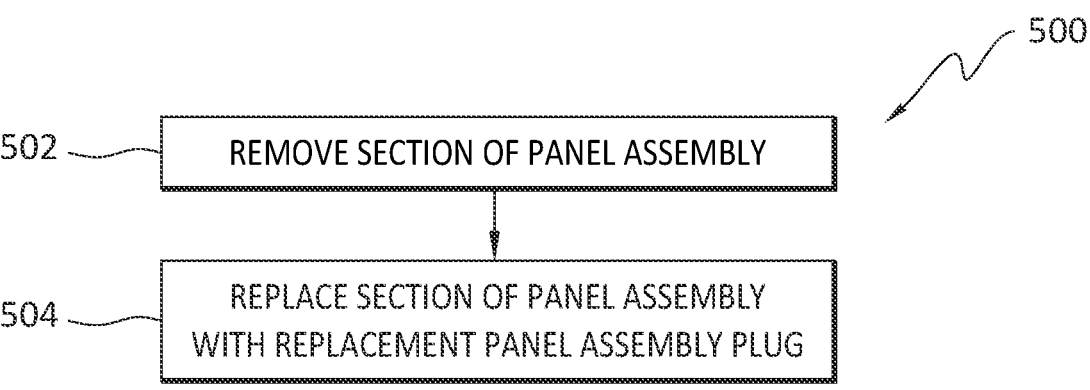

Having thus described variations of the disclosure in general terms, reference will now be made to the accompanying drawings, which are not necessarily drawn to scale, and wherein:

FIG. 1 is a perspective view of a vehicle in the form of an aircraft, according to present aspects;

FIG. 2 is a partially exposed overhead plan view of a vehicle in the form of an aircraft that can be the type of vehicle shown in FIG. 1, according to present aspects;

FIG. 3 is an exploded view of a panel assembly, according to present aspects;

FIG. 4 is an overhead plan view of a reinforcing core for a panel assembly, according to present aspects;

FIG. 5 is a side view of the reinforcing core for a panel assembly of the type shown in FIG. 4, according to present aspects;

FIG. 6 is an overhead plan view of present components of a present reinforcing core and showing a plurality of hollow spheres arranged into a geometric configuration, according to present aspects;

FIG. 7 is a perspective view of present components of a present reinforcing core for a present panel assembly, according to present aspects;

FIG. 8 is an overhead plan view of present components of a present reinforcing core assembly for a panel assembly, according to present aspects;

FIG. 9 is a side view of present components of a present reinforcing core assembly for a present panel assembly, according to present aspects;

FIG. 10 is a perspective view of present components of a present reinforcing core assembly for a present panel assembly, according to present aspects;

FIG. 11 is a side view of present components of a present reinforcing core assembly for a present panel assembly, according to present aspects;

FIG. 12A is an enlarged side view of present components of a present reinforcing core assembly for a present panel assembly as shown in FIG. 11, and according to present aspects;

FIG. 12B is a further enlarged side view of present components of a present reinforcing core assembly for a present panel assembly as shown in FIG. 11, and according to present aspects;

FIG. 13A is a perspective view of a hollow sphere sheet of a present reinforcing core for a present panel assembly, according to present aspects;

FIG. 13B is a further enlarged overhead plan view of a section of the hollow sphere sheet shown in FIG. 13A;

FIG. 14 is a perspective view of a present reinforcing core in a present reinforcing core assembly for a present panel assembly, according to present aspects;

FIG. 15 is an enlarged perspective view a present reinforcing core in a present reinforcing core assembly for a present panel assembly as shown in FIG. 14, and according to present aspects;

FIG. 16 is an overhead plan view of a panel comprising a present panel assembly requiring rework, according to present aspects;

FIG. 17A is an overhead plan view of the panel comprising a present panel assembly of the type shown in FIG. 16 during a rework process, according to present aspects;

FIG. 17B is a slightly elevated perspective view of a replacement panel assembly rework plug, according to present aspects;

FIG. 18 is an overhead plan view of the panel comprising a present panel assembly of the type shown in FIG. 16 and FIG. 17A during a rework process, according to present aspects;

FIG. 19 is a side view of a present reinforcing core assembly having a non-planar configuration, according to present aspects;

FIG. 20 is a perspective view of a present reinforcing core assembly for a present panel assembly, according to present aspects;

FIG. 21 is an enlarged side view of a present reinforcing core assembly of the type shown in FIG. 20, according to present aspects;

FIG. 22 is a perspective view of an aircraft component structure in the form of a storage bin component, according to present aspects;

FIG. 23 is a perspective view of an aircraft component structure in the form of a storage bin component with regions comprising a non-planar geometry, according to present aspects;

FIG. 24 is a method flowchart outlining a present method, according to present aspects;

FIG. 25 is a method flowchart outlining a present method, according to present aspects;

FIG. 26 is a method flowchart outlining a present method, according to present aspects;

FIG. 27 is a method flowchart outlining a present method, according to present aspects; and FIG. 28 is a method flowchart outlining a present method, according to present aspects.

DETAILED DESCRIPTION

According to present aspects, presently disclosed structurally durable and light-weight sandwich panel assemblies comprise a reinforcing core comprising a plurality of hollow spheres located substantially immediately adjacent to one another and retained in the reinforcing core within a foam material. The reinforcing core can be further incorporated into a variety of structures and assemblies, including structures and assemblies located, for example, on and within vehicles, including, for example, aircraft.

The present sandwich panels comprise a reinforcing core comprising a combination of selected materials configured to provide a structural sandwich panel performance enhancement that meets or exceeds previously incorporated honeycomb sandwich panels, and that overcomes disadvantages in honeycomb sandwich panels that can include complex fabrication, handling difficulties after fabrication to avoid deformation damage, and/or reworking process complexities that typically have been exceedingly labor-intensive for honeycomb sandwich panels. That is, the presently disclosed panel assembly and reinforcing core assembly comprising the present reinforcing core comprise significant fabrication, handling, installation, reworking, modification, orientation, performance, cost, and other advantages over traditional honeycomb sandwich cores and honeycomb sandwich panels.

FIG. 1 is a perspective view of a vehicle in the form of an aircraft 10 including a fuselage 12, and containing and otherwise including an aircraft cabin 14 within fuselage 12, and engine assembly 13 incorporated into the aircraft exterior. FIG. 2 is an overhead plan view of the aircraft cabin 14 within an aircraft of the type shown in FIG. 1 as aircraft 10. As shown in FIG. 2, aircraft cabin 14 can comprise at least one storage bin assembly 16 located in the aircraft.

FIG. 3 is an exploded view, according to present aspects, showing a panel assembly 20 comprising a first facesheet 22 and a second facesheet 24 with a present reinforcing core 26 interposed between the first facesheet 22 and second facesheet 24.

As shown in FIG. 3, the first facesheet 22 comprises a first facesheet first side 22a and a first facesheet second side 22b. First facesheet 22 can comprise more than one layer that can be more than one composite material layer that, further, can be an epoxy resin-containing material that can be in the form an epoxy-resin-containing material prepreg. As shown in FIG. 3, the first facesheet 22 comprises two first facesheet layers 22c that forms the first facesheet material "stack"; although first facesheet 22 can comprise a selected number of first facesheet layers 22c other than two layers. In one present aspect, the first facesheet can have a thickness ranging from about 20 mils to about 30 mils.

As further shown in FIG. 3, the second facesheet 24 comprises a second facesheet first side 24a and a second facesheet second side 24b. Second facesheet 24 can comprise more than one layer that can be more than one composite material layer that, further, can be an epoxy resin-containing material that can be in the form an epoxy-resin-containing material prepreg. In one present aspect, the second facesheet can have a thickness ranging from about 20 mils to about 30 mils.

As shown in FIG. 3, the second facesheet 24 comprises three second facesheet layers 24c comprising the second facesheet material "stack"; although second facesheet 24 can comprise a selected number of second facesheet layers 24c other than three layers. In further present aspects, one or more of the first and/or second facesheet layers can comprise a fiber containing material including at least one of carbon fibers, boron, fibers, glass fibers, and aramid fibers. The first and second facesheet layers can comprise the same or different materials.

The present panel assembly 20 shown in FIG. 3 further comprises a reinforcing core 26 comprising a plurality of hollow spheres 28 that are substantially equivalently-dimensioned (referred to equivalently herein as being "substantially identically-dimensioned") and that are positioned adjacent to one another within a foam material layer 32 (referred to equivalently herein as a "foam material layer segment"), with a foam material layer that can be presented in two segments (e.g., a "two-part" foam material layer). The reinforcing core comprises a reinforcing core first side 26a and a reinforcing core second side 26b.

The present panel assembly 20 (referred to equivalently herein as "hollow sphere/foam sandwich panel" and "hollow sphere/foam sandwich panel construction") is configured to exhibit at least equivalent and/or superior strength when compared with typical honeycomb sandwich panel assemblies. The present hollow spheres can be made from a composite material and/or a plastic material that can include a nylon-containing material and that can comprise a fiber containing material that can include at least one of a carbon fiber, a boron fiber, a glass fiber, and an aramid fiber, with one example of the present hollow sphere material having a flexural strength ranging from about 420 MPa to about 470 MPa; a flexural modulus ranging from about 40 GPa to about 50 GPa; a tensile strength ranging from about 680 MPa to about 770 MPa; and a tensile modulus ranging from about 47 GPa to about 58 GPa. Still further, materials selected for use to make the present plurality of hollow spheres can have a selected density ranging from about 0.7 $gm/cm^3$ to about 1.2 $g/cm^3$.

The hollow sphere material can be a thermoplastic material that can include a nylon mixed with a carbon fiber material. Present hollow sphere materials can deliver a material strength comparable to aluminum and can be a 3D-printable material for use in, for example, a 3D-printer or other additive manufacturing device.

The present reinforcing core 26 of the present panel assemblies can have a density of about 2.58 $gm/cm^3$ (3 $lbs/ft^3$) that represents a significant reinforcing core and panel assembly weight reduction (of about 10%) as compared to the typical honeycomb sandwich panels that are typically in current use. The significant weight reduction reduces the weight of the components and assemblies comprising the present sandwich panel assemblies, as well as realizing a significant overall weight reduction of large objects comprising the components and assemblies including, for example, aircraft component assemblies that are installed into aircraft. Weight reduction in an aircraft can directly impact and help achieve a reduction in fuel, an increase aircraft range, a lower operational cost, etc.

The present panel assembly 20 as shown in FIG. 3 further comprises a first adhesive layer 34 having a first adhesive layer first side 34a and a first adhesive layer second side 34b, with the first adhesive layer interposed between the reinforcing core first side 26a and the first facesheet second side 22b. Panel assembly 20 further comprises a second adhesive layer 36 comprising a second adhesive layer first side 36a and a second adhesive layer second side 36b, with the second adhesive layer interposed between the reinforcing core second side 26b and the second facesheet first second side 24b.

According to present aspects, the first and second adhesive layers can be made from the same or different adhesive materials and can comprise at least one of an epoxy-based adhesive material, an acrylic-based adhesive material, and a polyurethane-based adhesive material.

In addition, the first adhesive layer 34 and second adhesive layer 36 can be applied as a film, and in another present aspect, one or more of the first and second adhesive layers can be a single adhesive film layer. In another present aspect, each of the first and second adhesive film layers comprises an average thickness ranging from about 5 to about 10 mils. In another present aspect, the first and/or second adhesive layer can comprise a modified epoxy base. Still further, the first and second adhesive layers can be co-curable adhesive layers at a selected co-curing temperature. In addition, according to present aspects, the first and/or second adhesive layers can be co-curable with the first and/or second facesheets, and/or the plurality of hollow spheres.

That is, according to present aspects, two or more of: 1) the two facesheets; 2) the plurality of hollow spheres; and 3) the two adhesive layers can be co-curable with one another, including being co-curable at a temperature ranging from about 150° F. to about 350° F. In another present aspect, two or more of: 1) the two facesheets; 2) the plurality of hollow spheres; and 3) the two adhesive layers are co-curable with one another, including being co-curable at a room temperature ranging from about 65° F. to about 85° F.

The foam material selected for use in the foam material layer can be foam material that can be classified as an adhesive foam material and that can have a density ranging from about 45 kg/m³ to about 48 kg/m³, and that can further have a compressive strength (at 75° F.) ranging from about 40 psi to about 45 psi, and a tensile strength ranging from about 70 psi to about 75 psi; a shear strength ranging from about 40 psi to about 45 psi; and a flexural strength ranging from about 60 psi to about 65 psi.

The present foam material can be configured to comprise characteristics that facilitate or otherwise at least contribute to the accurate and selected positioning of the plurality of hollow spheres (e.g., in a selected positional orientation) in the reinforcing core that can be, for example, maintaining the plurality of the hollows spheres in position immediately adjacent to one another within the foam material in the reinforcing core in a selected geometric orientation that can be a hexagonal lattice configuration, and with the selected hexagonal lattice configuration configured to be maintained substantially within a single plane (e.g., along an x-axis) during manufacture of the reinforcing core. In a present aspect, the foam material can be a foam material having a selected tack In another present aspect, the foam material can be an adhesive foam material that can be an open-cell and/or closed-cell foam material. According to present aspects, and as shown in FIG. 3, the reinforcing core 26 in combination with the first and second adhesive layers 34, 36, respectively, form the reinforcing core assembly 40. The reinforcing core assembly 40 in combination with the first and second facesheets, 22, 24, respectively, together form the present panel assembly 20.

In further present aspects, the panel assembly, including the reinforcing core, and the reinforcing core assembly, comprises a structural flexibility that is capable of physical out-of-plane manipulation with the panel assembly (that comprises the reinforcing core) configured to achieve positioning as a sandwich panel assembly within a component that can have a non-planar shape that can include, for example, curved regions, irregularly shaped regions, etc., along the length and width of the component or component assembly comprising the present sandwich panel assemblies.

In one present aspect, the foam material can be presented to the reinforcing core as a two-part foam layer within which the plurality of hollow spheres reside. In a two-part foam material layer assembly, a plurality of hollow spheres can be introduced to contact and can otherwise be received by a first foam segment (referred to equivalently herein as a first foam material layer segment "base"). In a present aspect, the first foam segment can comprise a plurality of positioning features in the first foam section surface that can be dimensioned to receive and retain the plurality of hollow spheres in the depressions. In a present aspect, the depressions in the first foam segment are configured to receive and retain the plurality of hollow spheres in a selected geometric orientation with respect to one another. In another present aspect, the depressions in the first foam segment are configured to receive and retain immediately adjacently positioned hollow spheres in a hexagonal lattice arrangement (referred to equivalently herein as a "hexagonal lattice orientation" and/or a "hexagonal lattice geometry").

The first foam material segment positioning features can be depressions in the first foam segment that can extend to a selected depth into the thickness of the first foam segment. The selected depth of the depressions into the first foam segment can extend into the first foam segment to a depth that equates to a depth equal to from about 10% to about 100% of the thickness of the first foam segment. That is, when a first foam segment depression equals about 100% of the first foam segment thickness, a portion of the hollow sphere introduced into the first foam segment can be at least partially exposed at both sides of the first foam segment. In a present aspect, the first foam segment depressions can be semicircular depressions having a diameter that is substantially equal to the diameter of the hollow sphere that is introduced into the first foam segment.

In a present aspect, the selected depth of the depressions into the first foam segment can extend into the first foam segment to a depth that equates to a depth equal to from about 25% to about 75% of the thickness of the first foam segment (e.g., the first foam segment thickness). In another present aspect, the selected depth of the depressions into the first foam segment can extend into the first foam segment to a depth that equates to a depth equal to about 50% of the thickness of the first foam segment.

After the plurality of hollow spheres, that can be a plurality of individual and discrete hollow spheres (and that can further be a "sheet" of additively-manufactured interconnected hollow spheres, as described herein, that can be interconnected to maintain adjacently-positioned hollow spheres in immediate or in substantially immediate contact with one another), are presented to "fill" the first foam segment depressions, a second foam material layer segment can be introduced to substantially "cover" the oriented plurality of hollow spheres in a completed two-part foam material layer, with the plurality of hollow spheres incorporated within the two-part foam material (referred to equivalently herein as a "two-segment foam layer" and/or a "two-segment foam material layer").

The second material foam segment can comprise second foam segment positioning features that can be depressions in the second foam segment that can extend to a selected depth into the thickness of the second foam segment. The selected depth of the depressions into the second foam segment can extend into the second foam segment to a depth that equates to a depth equal to from about 10% to about 100% of the thickness of the second foam segment. That is, when a second foam segment depression equals about 100% of the second foam segment thickness, a portion of the hollow sphere covered by and introduced into the second foam segment can be at least partially exposed at one side of the second foam segment. In a present aspect, the second foam segment depressions can be semicircular depressions having a diameter that is substantially equal to the diameter of the hollow sphere that is covered by and introduced into the second foam segment.

In a present aspect, the selected depth of the depressions into the second foam segment can extend into the second foam segment to a depth that equates to a depth equal to from about 25% to about 75% of the thickness of the second foam segment (e.g., the second foam segment thickness). In another present aspect, the selected depth of the depressions into the second foam segment can extend into the second foam segment to a depth that equates to a depth equal to about 50% of the thickness of the second foam segment.

According to one present example, the reinforcing core 26 (the plurality of hollow spheres and foam layer) can comprise an overall reinforcing core thickness of about 0.25 inches, with the adhesive layer. The additional first and second adhesive layers 34, 36, each having an average thickness of less than about 10 mils, combined with the average first and second facesheet thickness each ranging from about 20 mils to about 25 mils further in combination with the average thickness of the reinforcing core 26 can yield a present panel assembly having an average panel assembly thickness of about 0.25 inches.

The present panel assembly average thickness and the present reinforcing core assembly average thickness of about 0.25 inches represents as much as at least a 50% reinforcing sandwich panel thickness decrease compared to typical honeycomb sandwich panel assemblies currently in use. Accordingly, the decrease in average panel assembly thickness (and that does not sacrifice panel strength in view of the decreased thickness) of the present reinforcing sandwich panels results in a significant advantages in terms of decreased panel weight, decreased panel cost, as well the decrease in overall weight, and decrease in operational and material cost of present larger assemblies and present structures incorporating the present reinforcing sandwich panels incorporating the present hollow-sphere and foam-containing reinforcing core.

FIG. 4 shows an overhead plan view of a present aspect, showing a partial construction of the present reinforcing core 26 comprising a plurality of hollow spheres 28 maintained in a selected geometric orientation with respect to one another in the form of a hexagonal lattice orientation (shown as the "outlined" hexagonal regions shown in FIG. 4), and with the plurality of hollow spheres introduced into a first foam material layer segment 33a (referred to equivalently herein as a "first foam base segment" and/or a "foam base segment"). As stated herein, although not shown in FIG. 4, the first foam segment can comprise positioning features that can be depressions in a first foam segment surface and that extend into the first foam segment thickness to a selected distance, for example, to dimensionally accommodate and otherwise accept into the first foam base segment a plurality of hollow spheres.

FIG. 5 is a side view of the reinforcing core assembly 40 in a completed state with the second foam segment 33b in position adjacent the plurality of hollow spheres 28, and the first foam segment 33a in position adjacent the plurality of hollow spheres 28. FIG. 5 further shows a first adhesive 34 and second adhesive layer 36 in position adjacent the reinforcing core 26 (that comprises the spheres and the foam material).

FIG. 6 is an overhead plan view of the plurality of hollow spheres 28, further showing the plurality of hollow spheres maintained substantially immediately adjacent to one another in a hexagonal geometric configuration (shown as the hexagonal "outlined" regions shown in FIG. 6), and with the plurality of hollow spheres maintained in a substantially constant or fixed plane (e.g., "in-plane" along a common x-axis) with respect to one another.

FIG. 7 is a perspective view of the present reinforcing core 26 comprising the first foam segment 33a and the second foam segment 34b surrounding and maintaining in position the relative orientation of the plurality of hollow spheres in a hexagonal lattice geometric orientation of the type shown at least in FIG. 6 (and shown as the hexagonal "outlined" regions shown in FIGS. 6 and 7). The construction of the reinforcing core 26 shown in FIG. 7 can be referred to as a "partial" reinforcing core assembly construction or an "incomplete" reinforcing core assembly construction since the first and second adhesive layers 34, 36 (as shown in the complete reinforcing core assembly 40 shown in FIG. 5), respectively, are not positioned in place, and are not shown in FIG. 7.

FIGS. 8, 9, 10, 11, 12A, and 12B are FIGs. showing various views of a present reinforcing core assembly 40, with the hollow spheres 28 maintained in position within the foam material 32, that can be a two-part foam material layer (e.g., two-segment foam material), and with the first and second adhesive layers 34, 36 also shown in place to, in combination, form the completed reinforcing core assembly 40.

FIG. 8 shows the present reinforcing core assembly 40 having a first adhesive layer 34 shown in place in the reinforcing core assembly 40. FIG. 9 is a cross-sectional side view of the present reinforcing core assembly 40 taken along line 9-9 of FIG. 8, with FIG. 9 further showing the first adhesive layer 34 and second adhesive layer 36 in place covering the reinforcing core 26, with reinforcing core shown comprising the plurality of hollow spheres 28 maintained in position by the foam material 32, and with reinforcing core 26 maintained within the first and second adhesive layers 34, 36, respectively to form the present reinforcing core assembly 40.

FIG. 10 is a perspective elevated view of the reinforcing core assembly 40 of the type shown in FIGS. 8 and 9. FIG. 11, is a partial cross-sectional and enlarged side view of the reinforcing core assembly 40 shown in FIG. 10, and showing the components of the reinforcing core assembly 40, as set forth and described in FIGS. 8, 9, and 10.

FIG. 12A is an enlarged "area" view of the partial cross-sectional side view of the present reinforcing core assembly 40 as shown in FIG. 11. FIG. 12A shows reinforcing core 40 comprising the plurality of hollow spheres 28 maintained in position within foam material layer 32, with foam material layer 32 comprising first foam segment 33a and second foam segment 33b, with the first and second foam segments configured to substantially surround and maintain in place the plurality of hollow spheres 28. Taken together, the first and second foam segments 33a, 33b, comprise foam material layer 32. In addition, the foam material layer in combination with the plurality of positioned hollow spheres 28 within foam material layer 32 form the reinforcing core 26. In the enlarged view shown in FIG. 12A, the plurality of hollow spheres 28 are shown comprising a hollow sphere outer surface 28a, a hollow sphere wall 28b, and a hollow sphere inner surface 28c, with the hollow sphere wall 28b bounded by the hollow sphere outer surface 28a and the hollow sphere inner surface 28c. As further shown in FIG. 12A, hollow spheres 28 comprise a hollow sphere outer diameter D1 and a hollow sphere inner diameter D2, with the "thickness" T1 of the hollow sphere wall 28b equal to the value of D1–the value of D2 (e.g., D1–D2=T1); with T1, according to one example, being equivalent to about 1 $\mu$m.

FIG. 12B is a further enlarged side view of present components of a present reinforcing core for a panel assembly as shown in FIGS. 11 and 12A, and according to present aspects. As shown in FIG. 12B, the hollow spheres 28 can comprise slightly "flattened" regions 76 at the point of potential contact between adjacently positioned spheres. The hollow spheres can further comprise slightly "flattened" regions 72,74 adjacent the first and second adhesive layers 34, 36, respectively. While being bound to no particular theory, the slightly flattened regions of the hollow sphere outer surfaces that contact the inner surfaces of first and second adhesive layers can increase the surface area of the hollow spheres that contacts the first and second adhesive layers and that can result in an increase in the bonding performance of the adhesive layers to the plurality of hollow spheres, and can otherwise increase the overall structural integrity of the present reinforcing core assembly, as well as facilitate a substantially planar surface after the adhesive layers are applied to the reinforcing core comprising the plurality of the hollow spheres and the foam material.

According to present aspects, the characteristics of the reinforcing core layer constituents of the reinforcing core 26 (e.g., the plurality of the hollow spheres 28 and the foam material 32) contribute to selected characteristics of the reinforcing core 26. As stated herein, the reinforcing core 26 in combination with the outer adhesive layers 34, 36 form the present reinforcing core assembly 40. The reinforcing core assembly 40 in combination with the affixed and otherwise incorporated facesheets 22, 24 form the present panel assembly 20. As disclosed herein, the placement of discrete and or adjoined hollow spheres into a selected geometric configuration can be facilitated by incorporating foam material segments that can comprise hollow sphere positioning features in the form of, for example, depressions in the foam material segments, with the positioning features dimensioned to receive, maintain in position, "seat", etc., the plurality of hollow spheres.

In addition, present aspects contemplate additively manufacturing the plurality of hollow spheres that can be additively manufactured into, for example, and additively manufactured "sheet" of a plurality of hollow spheres that can be a plurality of hollow spheres that are substantially similarly, equivalently, and/or identically dimensioned with respect to one another. In the process of additively manufacturing the plurality of hollow spheres, the plurality of hollow spheres can comprise additively manufactured integral connectors that adjoin immediately adjacent hollow spheres. The additive manufacturing of an immediately adjacent plurality of hollow spheres that are "interconnected" via the additively manufactured (e.g., 3D printed) integral connectors can facilitate placement of the a "sheet" of the plurality of hollow spheres that can have a selected sheet dimension to facilitate the incorporation of the plurality of hollow spheres with the foam material to form the reinforcing core 26 of the reinforcing core assembly 40 of the panel assembly 20, according to present aspects.

FIGS. 13, 14, and 15 show the plurality of hollow spheres that can be additively manufactured, with the plurality of hollow spheres comprising integral connectors to facilitate the formation of hollow sphere "sheets" that can be incorporated into the presently disclosed reinforcing core, reinforcing core assembly, and panel assembly, according to present aspects.

While present aspects contemplate the manufacturing of a selectively dimensioned plurality of hollow spheres via, for example, additively manufacturing the plurality of hollow spheres (e.g., via 3D printing, etc.), further manufacturing processes for selectively dimensioned pluralities of hollow spheres are presently contemplated (e.g., mold casting, spin casting the plurality of spheres, etc.).

In addition, present aspects contemplate the use of additive manufacturing to: 1) significantly increase present processing economy at least in terms of manufacturing cost, labor, inventory, time (e.g., at least in terms of tooling creation cost and/or the costs attending tooling storage, maintenance, replacement, etc.), etc., as well as to 2) significantly increase the manufacturing flexibility of present apparatuses, systems, and methods through the use of additive manufacturing in terms of the printing, on demand, of various physical and chemical characteristics that can be infused into the present plurality of hollow spheres, and hollow sphere "regions" within a hollow sphere "sheet" on demand, and in real time, for example, by selectively varying the feedstock used to additively manufacture individual hollow spheres and to additively manufacture hollow sphere "regions" in a hollow sphere "sheet".

The use of present additive manufacturing processes to form the present plurality of hollow spheres can significantly increase the performance of the present apparatuses, systems, and methods by intentionally altering physical characteristics between and among the plurality of hollow spheres over a given area, when such tailored alteration is desired, at least for the purpose of potentially and intentionally varying/altering the performance capabilities and characteristics of the present sandwich panel assemblies in various and varied regions across the area of the present sandwich panel assemblies.

FIG. 13A shows a plurality of hollow spheres 28 comprising integral connectors 30 (visible in FIG. 13A, and shown in FIGS. 13B, 14, and 15), and that can be manufactured into a hollow sphere sheet 31, for example, by incorporating additive manufacturing processes for the fabrication of such hollow sphere sheets 31. FIG. 13B is an enlarged overhead plan view of the hollow sphere sheet 31 taken at the circled region shown in FIG. 13A. As shown in FIG. 13B, hollow sphere sheet 31 comprises a plurality of hollow spheres 28 that are interconnected via integral connectors 30. FIGS. 13A and 13B further show the foam material layer that can be presented as multiple foam material segments (e.g., a two-part foam material layer) into a reinforcing core, with the plurality of hollow spheres introduced into a foam material layer first segment. After the plurality of hollow spheres is presented to and/or introduced into and/or otherwise positioned within the foam material layer first segment, the plurality of hollow spheres can be substantially covered by a foam material layer second segment to form the reinforcing core that comprises the foam material and the plurality of hollow spheres.

FIG. 14 shows a reinforcing core assembly 40 comprising first and second adhesive layers 34, 36, respectively bounding a reinforcing core 26 that comprises a plurality of hollow spheres 28 in a foam material layer 32. As shown in FIG. 14, the plurality of hollow spheres 28 are incorporated into the reinforcing core 26 (and the reinforcing core assembly 40) as a hollow sphere sheet 31 with each hollow sphere connected to an adjacently positioned hollow sphere 28 via an integral connector 30. FIG. 15 is an enlarged end view of the reinforcing core assembly 40 shown in FIG. 14 with the features shown in FIG. 14 perhaps more easily visible, including the hollow sphere outer surface 28a, the hollow sphere wall 28b and the hollow sphere inner surface 28c, as well as the integral connector 30 integrally connecting adjacent plurality of hollow spheres in a selected position within a hollow sphere sheet 31.

The present panel assembly can be incorporated into structures, including composite structures, and larger assemblies that can incur wear during a useful lifetime and during operation, for example, with such larger structures and assemblies including, for example, aircraft fuselages, cargo doors, cargo door exteriors, aircraft engine housings, aircraft cabin structures, etc. Component wear can be incurred by a component/assembly comprising the present internal sandwich panel assembly.

In addition, routine maintenance of a large component can determine that rework of a portion of, or a region only of, a various large structure comprising the present sandwich panel assembly is required. Still further, spot-check, and/or routine inspection, including non-destructive inspection, of a structure comprising the sandwich panel assembly can determine the need for rework of a portion of a sandwich panel assembly. In such instances where rework is to be undertaken, present apparatuses, systems, and methods are significantly advantageous as compared to the labor-intensive rework that is involved to rework, for example, the typical honeycomb sandwich panels currently in use. That is, the typical configuration of honeycomb "cells" in current honeycomb sandwich panels has involved labor-intensive honeycomb panel section removal and replacement that may be highly individualized and non-standardized (e.g., honeycomb septum rework, honeycomb "cell" alignment during honeycomb cell replacement along, for example, an entire thickness and/or length of a honeycomb panel, etc.).

The presently disclosed apparatuses, systems, and methods that present a reinforcing core that is not honeycomb-based, and that, instead, presents a plurality of discrete hollow spheres that can be advantageously severed and otherwise "separated" from one another without adversely impacting (e.g., damaging, rupturing, etc.) immediately adjacent hollow spheres allows the present sandwich panel assemblies to undergo a more streamlined, a more standardized, and a potentially more successful rework protocol that is less labor intensive, that is more-cost-effective, and that significantly increases the maintained integrity and performance of the present sandwich panel assembly requiring rework. In addition, the significantly increased potential for successful rework of the present sandwich panel assemblies can allow the same panel and the same structure incorporating the same present sandwich panel to be able to undergo multiple reworking procedures, without needing to replace an entire larger structure. This ability to repeatedly rework a single structure without needing to discard or replace an entire larger structure is in contrast to typical rework schedules that may only allow one rework to be conducted on any one structure requiring such repeated rework.

FIGS. 16, 17A, 17B, and 18 show illustrations of a significantly improved reworking progression, according to present aspects. FIG. 16 shows a view of present panel assembly 20 that can be installed to form a structural component in a larger assembly as disclosed herein, with panel assembly 20 undergoing a first step in a progression of a reworking process, with initial rework region 50 exposing the reinforcing core 26. As shown in FIG. 16, a section of reinforcing core 26 comprises the plurality of hollow spheres 28 and the foam material 32 of a reinforcing core section to be reworked.

FIG. 17A shows another step in a rework process progression with a rework area expanded from the initial rework area shown in FIG. 16, and with final rework area 52 shown in FIG. 17A representing the region to be removed via reworking, with the total amount of material removed during rework extending into panel assembly 26 to a selected depth that is configured to extend to the depth that is substantially equal to a depth equivalent to remove the entirety of plurality of hollow spheres and the first facesheet, and if desired, may also entail (although not shown) the removal of the second facesheet material.

FIG. 17B shows a panel assembly plug 54 (referred to equivalently herein as "panel assembly replacement plug") that is dimensioned to be substantially similar in dimension to the material removed from panel assembly 26 during rework. FIG. 18, illustrates the next step in a rework progression where panel assembly plug 54 (as shown in FIG. 17B) can comprise components of the present reinforcing core assembly 40 (e.g., the plurality of hollow spheres 28 in the foam material 32 and further comprising the first adhesive layer 34 respectively). In addition, according to present aspects and not specifically shown in FIG. 17B, the present panel assembly plug can further comprise first facesheet 22 applied to the first adhesive layer 34 to form a panel assembly plug 54 that can comprise the components of the present panel assembly 20. (the reinforcing core assembly components and the facesheets) the has been installed in panel assembly 20 to form a reworked panel assembly 20a (shown in FIG. 18).

According to significantly advantageous present aspects, during rework of the present panel assembly, an amount of the plurality of hollow spheres that can be arranged in a hexagonal lattice geometry in the reinforcing core of the panel assembly, can be removed (shown in FIG. 17A as the "outlined region" of the plurality of hollow spheres) to leave complete and completely intact hollow sphere structures. This is a significant departure from the typical resultant honeycomb-containing sandwich panels that sustain rework, where the "cells" of honeycomb structure in a honeycomb sandwich panel typically share a cell wall that can be impacted and/or damaged during material removal during rework, with the impacted and damaged "cells" and/or cell walls of the honeycomb panel typically requiring individual cell wall repair during rework. Such individualized cell and cell-wall and septum repair of typical honeycomb structures typically involves a significant amount of labor-intensive rework that typically cannot be automated, and that typically involves the introduction of varying amounts of adhesive and/or other materials that can, for example, change a honeycomb cell wall thickness, etc., and that can impact structural characteristics of the reworked area, and/or panel component properties that can include, for example, acoustic properties that can be adversely impacted during and after the rework.

In addition, with respect to typical industry rework protocol, once a panel area has been reworked once, pertinent regulations may not allow subsequent rework of the same or nearly the same panel area. Present aspects can contribute to maintaining the structural and performance integrity of a reworked panel as panel material removal during rework, according to present aspects, does not disturb, damage, impact, etc., the integrity of the hollow sphere walls (that are configured to remain in a panel being reworked and that were positioned) adjacent to the hollow spheres that are removed during rework of the panel assembly. Accordingly, the present reinforcing core, the present reinforcing core assembly, and the present panel assembly represent and possess significant advantages at least with respect to the significant potential improved reworking procedures that are capable when employing the present reinforcing core, the present reinforcing core assembly, and the present panel assembly and when incorporating the present structures in a larger assembly and/or larger structure, including, for example, larger aircraft assemblies and/or larger aircraft structures.

Further significant present advantages of the present reinforcing core, present reinforcing core assembly, present panel assemblies comprising the reinforcing core assembly and present larger structures and present larger assemblies incorporating the present panel assemblies, are illustrated in FIG. 19. FIG. 19 shows a reinforcing core 26 comprising the plurality of spheres and foam combined with the first and second adhesive layers 34,36 (to form the reinforcing core assembly 40), respectively and with the reinforcing core 26 (and the reinforcing core assembly 40) comprising a series of significant directional changes and variations along the length of the illustrated reinforcing core 26 (and reinforcing core assembly 40).

According to present aspects, the flexibility and spatial versatility of the present reinforcing core 26, the present reinforcing core assembly 40, and the present panel assembly 20 incorporating the present reinforcing core assembly, allows for superior and improved handling, manipulation, and maneuvering without causing deformation and/or damage to the integral components of the reinforcing core 26 (that includes the plurality of the hollow spheres in combination with the foam material) and reinforcing core assembly 40. Present aspects contemplate fashioning the present reinforcing core assemblies, and present panel assemblies comprising the present reinforcing core assemblies, into complex spatial and complex geometric shapes and orientations that can be, for example, non-planar geometries. Such complex spatial and complex geometric shapes can include irregular shapes that can further include non-planar shapes and non-planar geometries, contours, angles, changing angles that can be significantly changing angles, etc.

As shown in FIG. 19, the present reinforcing core assembly 40 can be initially fabricated as a singular and/or unitary reinforcing core assembly in a selected orientation that can be a substantially planar orientation (e.g., a planar "sheet"). The physical characteristics of the reinforcing core assembly components (the plurality of hollow spheres/foam material/ first and second adhesive sheets) and the physical characteristics of the panel assembly that comprises the reinforcing core assembly with the applied first and second facesheets, allows for the significantly improved handling, transportation, storage, and installation of the structures without causing damage and/or unwanted deformation to the incorporated components. In addition, the physical characteristics of the reinforcing core assembly components (the plurality of hollow spheres/foam material/first and second adhesive sheets) and the physical characteristics of the panel assembly that comprises the reinforcing core assembly (with the applied first and second facesheets in place in a panel assembly), can facilitate the intentional manipulation of the structures into manipulated selected final use geometries and spatial orientations that can be irregular, non-planar, etc., spatial orientations without causing damage and/or unwanted deformation to the incorporated reinforcement core and/or reinforcement core components.

Without being bound to any particular theory, at least in a pre-cured state, the present components of the present reinforcing core assembly can sustain a significant degree of out-of-plane movement and manipulation without incurring a decrease in structural performance. This can be due to the plurality of adjacent hollow spheres realizing an allowed and selected degree of rotational movement with respect to one another as the reinforcing core assembly is manipulated from a planar sheet orientation into, for example, an out-of-plane configuration of the type shown in FIG. 19. The degree of relative freedom of rotational movement between adjacent hollow spheres can be facilitated by introducing the slightly flattened regions of hollow sphere outer surfaces of adjacently positioned hollow spheres. The hollow sphere wall thicknesses can be configured to remain substantially constant even though the inner and outer diameters of the hollow "spheres" comprising the slightly flattened regions may be technically considered to be slightly "out-of-round". According to present aspects, both rounded hollow spheres with and without slightly flattened regions are considered, according to present aspects, as being "spherical" (equivalently referred to herein as "substantially spherical").

The advantageous and significantly improved versatility and flexibility of the present reinforcing core, present reinforcing core assembly, and the present panel assembly incorporating the present reinforcing core assembly can be installed into larger assemblies and structures as a one-piece construction without sacrificing performance across the area of the present structure; and in strong contrast to known reinforcing sandwich panel assemblies that incorporate, for example, multiple discrete sections of honeycomb sandwich panels.

That is, a typical honeycomb sandwich panel could not be effectively manipulated into a complex shape of the type shown in FIG. 19, without presenting multiple, discrete, substantially planar honeycomb panel segments that are then joined in a separate joining operation to achieve the changing angles of a component shape as shown in FIG. 19. The formation of a honeycomb sandwich panel into the shape as shown in FIG. 19 can require a significant increase in labor, process time, cost, material, and potential added weight of adhesive materials used to join multiple honeycomb sandwich panel segments, etc. For example, in a typical honeycomb sandwich panel installation to achieve the component shape shown in FIG. 19, four (4) substantially planar honeycomb sandwich panels could be required, with each of the four substantially planar honeycomb sandwich panels requiring time-consuming and labor-intensive joining procedures that can increase overall cost, as well as requiring the addition of joining material that could undesirably increase overall weight, again resulting in an overall cost increase.

In addition, attempts to manipulate a singular honeycomb sandwich panel from a planar orientation to a non-planar orientation at points and locations across its area, can risk damage leading to, for example, the at least an unwanted partial deformation and/or "crushing" of individual honeycomb cells at the point where a change of direction or "bend" in the sandwich panel is induced, or otherwise occurs.

In strong contrast to honeycomb panel constructions, according to present aspects, the dimension (e.g., the diameter, etc.) of the plurality of hollows spheres at selected locations of the reinforcing core can be altered predictably in real time and on demand during, for example, additive manufacturing of a hollow sphere "sheet", to further facilitate a 'bend" during panel assembly installation. For example, the intentional dimensional alteration of the hollow spheres at a selected location in the reinforcing core can work in concert with the flattened regions of the hollow spheres to facilitate the "out-of-plane" shaping, orientation, physical manipulation, etc., of the present reinforcing cores into a selected shape or geometry, etc., and to a selected end use, without risking structural reinforcement core damage and/or deformation, and without sacrificing the structural integrity and/or selected performance characteristics of the reinforcing core and panel assembly comprising the reinforcing core.

According to present aspects, as shown in FIG. 19, the present reinforcing core 26 and present panel assembly incorporating the present reinforcing core assembly 40 can be fabricated as a singular, one-piece and/or unitary sheet (via, for example, additive, or "3D", manufacturing) that can be manipulated into a final use spatial orientation of the type shown, for example in FIG. 19.

In terms of resisting damage and/or unwanted deformation, and in terms of preserving structural integrity as well as selected panel performance characteristics (e.g., selected acoustic panel performance across the area of the panel, etc.) of the present reinforcing core assembly and panel assembly, present aspects further comprise significantly improved integral "potting" features in the present panel assembly incorporating the present reinforcing core assembly. "Potting", at least in the field of reinforcing sandwich panels (including, for example, acoustic sandwich panels, etc.), refers to the incorporation of attachment features and attachment components that are introduced into the sandwich panel to facilitate and otherwise achieve a selected attachment and incorporation of the sandwich panel into position into a larger structure and/or larger assembly.

FIGS. 20 and 21 show the present reinforcing core assembly 40 that, as shown, further comprises the potting component 60 that comprises a receiving channel 62 within the potting component 60. FIG. 20 shows a slightly elevated perspective view of a present reinforcing core assembly 40 comprising the plurality of hollow spheres 26 and the foam material 32 to form the present reinforcing core 26 with first and second adhesive layers 34, 36 in place to along with reinforcing core 26 form the present reinforcing core assembly 40. FIG. 20 further shows a partial cross-sectional view of potting component 60 with internal (potting component) receiving channel 62 extending through the length of the potting component 60, with receiving channel configured to receive a fastener (not shown in FIG. 20) that is configured to be inserted into and/or through receiving channel 62 that can be a fastening arrangement such that potting component 60 mates with a fastener to secure, for example, a panel assembly comprising reinforcing core assembly 40 to a larger structure and/or a larger assembly that can be, for example, and aircraft structure and/or aircraft assembly that can be an aircraft fuselage, an aircraft engine assembly, an aircraft cabin component, etc. FIG. 21 is an enlarged partial cross-sectional side or end-view of the present reinforcing core assembly 40, and showing the similarly enumerated features presented, shown, and described with respect to FIG. 20.

The present advantages of the construction described herein of the reinforcing core incorporating the plurality of hollow spheres as a structural reinforcing component facilitates the incorporation of a potting feature in the form of the presently described potting component, with the potting component having a footprint that can be equal in dimension to the footprint of one or more hollow spheres. That is, according to present aspects, the relative footprint of the potting feature and the footprint of an individual hollow sphere can be configured to minimize the structural impact on the present panel assembly, as, for example, a single hollow sphere can be sacrificed from the panel assembly to accommodate the potting feature.

In addition, if securing the panel assembly requires a larger attachment feature, such that the potting component footprint (e.g., width) extends beyond the footprint (diameter) of a single hollow sphere, present aspects contemplate the replacement of a minimal number of hollow spheres from the reinforcing core to accommodate a potting component having a selected dimension. Regardless of the number of potting features selected to attach a present panel assembly to a larger structure and/or assembly, present aspects contemplate retaining the selected structural integrity of the present reinforcing cores, as the presence of the potting component will not damage (e.g., rupture, etc.) a hollow sphere.

Once again, the structural integrity of the present panel assembly is advantageously superior also in this regard to typical honeycomb sandwich panels that can incorporate potting features into a honeycomb reinforcing core with added steps and additional stabilizing epoxy or other stabilizing material to retain the potting element in a selected position, with substantial risk of the potting element causing some degree of damage to one or more honeycomb cells, septums, etc., that can itself result in the need for rework. In addition, incorporating potting elements into typical sandwich panels has been accomplished manually, is labor-intensive, and can further increase processing time and cost. In strong contrast, according to present aspects, introducing the present potting component into the present panel assembly can be an automated function, with, for example, the potting component additively manufactured along with or separately from the additive manufacturing step used to produce the plurality of hollow spheres.

Present aspects further contemplate the present panel assembly comprising the present reinforcing core assembly comprising the present reinforcing core being configured to comprise acoustic characteristics that can, for example, attenuate sound. According to present aspects, the present panel assembly can be an acoustic panel assembly with at least the components of the reinforcing core modified or otherwise configured to attenuate sound and/or attenuate, cancel, absorb, etc. selected sound frequencies. According to present aspects, one or more of the present plurality of hollow spheres can be manufactured, additively manufactured, machined after manufacture, etc., to comprise sound attenuation features that can include the introduction of one or more openings through the hollow sphere wall thickness. The number of openings, the dimension of the opening, the orientation of the opening through the wall thickness and number of the plurality of hollow spheres having one or more openings alone or in concert with the selected foam material, can be selected to engage with, interfere with, or otherwise "absorb" and/or selectively impact one or more selected sound frequencies for the purpose of attenuating sound emanating from, for example, machinery, and/or in the case of a vehicle, the sound created as the vehicle (that can be an aircraft) moves a medium such as air that causes sound, etc.

According to present aspects, the present panel assembly can be installed or otherwise incorporated into assemblies and or components where acoustic panels find utility including on aircraft regions that can include a fuselage, an engine assembly, generators, heaters, blowers, as well as structures within an aircraft passenger cabin that can dampen, absorb, or otherwise selectively attenuate sound frequencies from regions inhabited by passengers that are in the presence of ambient sound emanating from such machinery, etc. In addition, present panel assemblies in the form of acoustic panel assemblies can be incorporated to attenuate sound with acoustic panels placed in proximity to engine assemblies, and that can further attenuate sound at the exterior of an aircraft that could be experienced and otherwise "heard" by, e.g., ground-based persons in proximity to a passing aircraft, etc.

FIGS. 22 and 23 are perspective views of a present aircraft cabin assembly in the form of a present storage bin assembly (e.g., a stowage bin) and present storage bin component, respectively that can incorporate the present panel assembly that comprises the present reinforcing core assembly, and which further incorporates the present reinforcing core. As shown in FIG. 22, a storage bin assembly 16 can comprise a storage bin panel 16*a* of the type shown in FIG. 23 and that can be incorporated into, attach to, be integral with, and/or be configured to cover the storage bin assembly 16 shown in FIG. 22. The storage bin assembly and components shown in FIGS. 22 and 23 are not intended to be limiting and, instead, non-exhaustively represent a type of aircraft cabin assembly that can employ the present panel assembly, with the present panel assembly configured to provide structural capabilities and that can be incorporated at least into the type of aircraft structures that are configured to incorporate reinforcing and/or sound attenuation sandwich panels.

FIGS. 24, 25, 26, 27, and 28 are flowcharts outlining methods 100, 200, 300, 400, and 500, respectively, and according to present aspects.

According to a present aspect, FIG. 24 shows a method 100 for making a reinforcing core assembly, with the method 100 including incorporating 102 a plurality of hollow spheres into a first foam material segment, with the plurality of spheres positioned immediately adjacent to one another, with the first foam material segment comprising a first foam material segment first side and a first foam material second side. The method further includes applying 104 a second foam material segment to the plurality of hollow spheres to form a reinforcing core, with reinforcing core comprising a reinforcing core first side and a reinforcing core second side, applying 106 a first adhesive layer to the reinforcing core first side, applying 108 a second adhesive layer to the reinforcing core second side, and forming 110 the reinforcing core assembly, with reinforcing core assembly comprising the first adhesive layer, the second adhesive layer, and the reinforcing core. The method further optionally includes co-curing 112 two or more of the first adhesive layer, the second adhesive layer, and the plurality of the interconnected hollow spheres to form a co-cured reinforcing core assembly.

FIG. 25 outlines a present method 200 for making a reinforcing core assembly, with method 200 comprising additively manufacturing 202 a plurality of hollow spheres that can be a plurality of interconnected hollow spheres. Method 200 further comprises incorporating 102 a plurality of hollow spheres into at least one foam material segment, with the plurality of spheres positioned immediately adjacent to one another, with the at least one foam material segment comprising an at least one foam material segment first side and an at least one foam material second side. In an alternate present example, the at least one foam material segment comprises at least a first foam material segment and a second foam material segment material. In the alternate present example, a method further includes applying 104 a second foam material segment to the plurality of hollow spheres to form a reinforcing core, with reinforcing core comprising a reinforcing core first side and a reinforcing core second side, applying 106 a first adhesive layer to the reinforcing core first side, applying 108 a second adhesive layer to the reinforcing core second side, and forming 110 the reinforcing core assembly, with reinforcing core assembly comprising the first adhesive layer, the second adhesive layer, and the reinforcing core. The method further optionally includes co-curing 112 two or more of the first adhesive layer, the second adhesive layer, and the plurality of the interconnected hollow spheres.

FIG. 26 is a flowchart outlining a present method 300 for making a panel assembly, with the method 300 including providing 302 a reinforcing core, with the reinforcing core including a reinforcing core first side, a reinforcing core second side, and a plurality of hollow spheres positioned immediately adjacent to one another, with the plurality of hollow spheres comprising a hollow sphere outer surface, with the plurality of hollow spheres further comprising a hollow sphere outer diameter (D1), and with the plurality of hollow spheres further comprising a hollow sphere inner diameter (D2). The reinforcing core further includes a foam material layer, with the plurality of hollow spheres positioned within the foam material layer, and with the foam material layer in combination with the plurality of hollow spheres configured to form the reinforcing core. The method 300 further includes applying 304 a first adhesive layer to the reinforcing core first side, applying 306 a second adhesive layer to the reinforcing core second side, adhering 308 a first facesheet to the first adhesive layer and adhering 310 a second facesheet to the second adhesive layer to form the panel assembly.

FIG. 27 is a flowchart outlining a present method 400, with the method 400 including the steps outlined in method 300 shown in FIG. 26, and with method 400 further including co-curing 402 two or more of the first adhesive layer, the second adhesive layer, the plurality of the interconnected hollow spheres, the first facesheet, and the second facesheet.

FIG. 28 is a flowchart outlining a method 500 for reworking a panel assembly, with the method 500 including removing 502 a selected section of the panel assembly, with the selected section of the panel assembly comprising a selected panel assembly dimension, and replacing 504, in situ, the selected section of the panel assembly with a replacement panel assembly plug, with the replacement panel assembly plug comprising a replacement panel assembly plug dimension. The replacement panel assembly plug panel further includes a reinforcing core, with the reinforcing core including a foam material, and with the reinforcing core further including a plurality of hollow spheres, and wherein the replacement panel assembly plug dimension is substantially equivalent to the selected panel assembly dimension.

Another present aspect is directed to a panel assembly reworked according to the presently disclosed method 500 for reworking a panel assembly.

The methods 100, 200, 300, 400, 500, outlined in FIGS. 24, 25, 26, 27, 28, respectively, can incorporate the present reinforcing cores, the present reinforcing core assemblies, and the present panel assemblies described herein and set forth in FIGS. 3, 4, 5, 6, 7A, 7B, 8, 9 10, 11, 12, 13A, 13B, 14, 15, 16 17, 18, 19, 20, 21, 22, and 23, according to present aspects.

The term positioned "substantially", "substantially" adjacent, "substantially" housed within, etc., as used herein means that a particular physical element is almost completely or is nearly completely positioned or adjacent to and/or is nearly entirely housed within another stated element.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed:

1. A reinforcing core for a panel assembly, said reinforcing core comprising:

a reinforcing core first side and a reinforcing core second side;

a plurality of individual hollow spheres positioned adjacent to one another, said plurality of individual hollow spheres positioned adjacent to one another is configured to realize an allowed and selected degree of rotational movement with respect to one another, said plurality of individual hollow spheres each comprising a hollow sphere outer surface, said plurality of individual hollow spheres further each comprising a hollow sphere outer diameter, said plurality of individual hollow spheres further each comprising a hollow sphere inner diameter and a hollow sphere wall, said hollow sphere wall comprising a hollow sphere outer wall thickness; and at least one foam material layer segment configured to receive said plurality of individual hollow spheres, said plurality of individual hollow spheres received into a selected position within the at least one foam material layer segment, said plurality of individual hollow spheres positioned within the at least one foam material layer segment, said at least one foam material layer segment in combination with the plurality of individual hollow spheres configured to form the reinforcing core;

wherein said individual hollow spheres each comprise a hollow sphere material, the hollow sphere material having a flexural strength ranging from about 420 MPa to about 470 MPa, a flexural modulus ranging from about 40 GPa to about 50 GPa, a tensile strength ranging from about 680 MPa to about 770 MPa, a tensile modulus ranging from about 47 GPa to about 58 GPa, and a selected density ranging from about 0.7 $gm/cm^3$ to about 1.2 $g/cm^3$; and wherein said reinforcing core is configured to sustain a significant degree of out-of-plane movement and manipulation when the reinforcing core assembly is manipulated from a planar sheet orientation into an out-of-plane configuration.

2. The reinforcing core of claim 1, further comprising a first adhesive layer adhered to the reinforcing core first side, and a second adhesive layer adhered to the reinforcing core second side, said reinforcing core in combination with the first adhesive layer and in further combination with the second adhesive layer configured to form a reinforcing core assembly.

3. The reinforcing core of claim 1, wherein the each of the plurality of individual hollow spheres are interconnected hollow spheres.

4. The reinforcing core of claim 2, wherein two or more of the first adhesive layer, the second adhesive layer, and the plurality of individual hollow spheres are co-curable at a co-curing temperature to form a co-cured reinforcing core assembly.

5. The reinforcing core of claim 4, said co-curing temperature ranging from about 180° F. to about 350° F.

6. The reinforcing core of claim 1, wherein each of the plurality of individual hollow spheres comprises a plurality of additively manufactured to form a sheet of interconnected hollow spheres.

7. A composite material assembly stack comprising the reinforcing core of claim 1.

8. A vehicle comprising the reinforcing core of claim 1.

9. An aircraft comprising the reinforcing core of claim 1.

10. A panel assembly comprising:

a first facesheet comprising a first facesheet outer surface and a first facesheet inner surface, said first facesheet comprising at least one of a metal material and a composite material;

a second facesheet comprising a second factsheet outer surface and a second facesheet inner surface, said second facesheet comprising at least one of a metal material and a composite material;

a reinforcing core comprising a reinforcing core first side and a reinforcing core second side, said reinforcing core interposed between the first facesheet inner surface and the second facesheet inner surface, said reinforcing core comprising:

a plurality of individual hollow spheres positioned adjacent to one another, each of said plurality of individual hollow spheres positioned adjacent to one another to realize an allowed and selected degree of rotational movement with respect to one another, each of said plurality of individual hollow spheres each comprising a hollow sphere outer surface, said plurality of individual hollow spheres further each comprising a hollow sphere outer diameter, said plurality of individual hollow spheres further each comprising a hollow sphere inner diameter and a hollow sphere wall, said hollow sphere wall comprising a hollow sphere outer wall thickness;

at least one foam material layer segment configured to receive said plurality of individual hollow spheres, said plurality of individual hollow spheres received into a selected position within the at least one foam material layer segment, said plurality of individual hollow spheres positioned within the at least one foam material layer segment, said at least one foam material layer segment in combination with the plurality of individual hollow spheres configured to form the reinforcing core;

a first adhesive layer positioned between the reinforcing core first side and the first facesheet inner surface; and a second adhesive layer positioned between the reinforcing core second side and the second facesheet inner surface;

wherein said individual hollow spheres each comprise a hollow sphere material, the hollow sphere material having a flexural strength ranging from about 420 MPa to about 470 MPa, a flexural modulus ranging from about 40 GPa to about 50 GPa, a tensile strength ranging from about 680 MPa to about 770 MPa, a tensile modulus ranging from about 47 GPa to about 58 GPa, and a selected density ranging from about 0.7 $gm/cm^3$ to about 1.2 $g/cm^3$; and wherein said reinforcing core is configured to sustain a significant degree of out-of-plane movement and manipulation as the reinforcing core assembly is manipulated from a planar sheet orientation into an out-of-plane configuration.

11. The panel assembly of claim 10, wherein each of the plurality of hollow spheres comprise a substantially equivalent hollow sphere outer diameter, each of said plurality of hollow spheres further comprising a substantially equivalent hollow sphere inner diameter.

12. The panel assembly of claim 10, wherein each of the plurality of hollow spheres are positioned at a selected uniform distance from one another.

13. The panel assembly of claim 10, wherein each of the plurality of hollow spheres are interconnected.

14. The panel assembly of claim 10, wherein each of the plurality of individual hollow spheres each comprise a hollow sphere outer wall average thickness ranging from about 0.8 μm to about 1.2 μm.

15. The panel assembly of claim 10, wherein the first adhesive layer is a first adhesive single film layer, and wherein the second adhesive layer is a second adhesive single film layer.

16. An aircraft component assembly comprising the panel assembly of claim 10.

17. An aircraft comprising the panel assembly of claim 10.

18. A method for making a reinforcing core assembly, the method comprising:

incorporating a plurality of hollow spheres into a first foam material layer segment, each of said plurality of individual hollow spheres positioned adjacent to one another to realize an allowed and selected degree of rotational movement with respect to one another, said individual hollow spheres each comprising a hollow sphere outer surface, said individual hollow spheres further each comprising a hollow sphere outer diameter, said individual hollow spheres further each comprising a hollow sphere inner diameter and a hollow sphere wall, said hollow sphere wall comprising a hollow sphere outer wall thickness, said individual hollow spheres each comprising a hollow sphere material, the hollow sphere material having a flexural strength ranging from about 420 MPa to about 470 MPa, a flexural modulus ranging from about 40 GPa to about 50 GPa, a tensile strength ranging from about 680 MPa to about 770 MPa, a tensile modulus ranging from about 47 GPa to about 58 GPa, and a selected density ranging from about 0.7 gm/cm$^3$ to about 1.2 g/cm$^3$, said first foam material layer segment comprising a first foam material layer segment first side and a first foam material layer segment second side;

applying a second foam material layer segment to the plurality of hollow spheres to form a reinforcing core, said reinforcing core comprising a reinforcing core first side and a reinforcing core second side;

applying a first adhesive layer to the reinforcing core first side; and applying a second adhesive layer to the reinforcing core second side to form the reinforcing core assembly, said reinforcing core assembly comprising the first adhesive layer, the second adhesive layer and the reinforcing core;

wherein said reinforcing core is configured to sustain a significant degree of out-of-plane movement and manipulation as the reinforcing core assembly is manipulated from a planar sheet orientation into an out-of-plane configuration.

19. The method of claim 18, wherein the plurality of hollow spheres are positioned adjacent to one another in a substantially singular plane.

20. The method of claim 18, further comprising:

additively manufacturing the plurality of hollow spheres.

* * * * *